US012654886B2

(12) United States Patent
Foster et al.

(10) Patent No.: US 12,654,886 B2
(45) Date of Patent: Jun. 16, 2026

(54) SYSTEMS AND METHODS FOR CONTROLLING TORQUE FOR AERIAL VEHICLE

(71) Applicant: Sonin Hybrid, LLC, Atlanta, GA (US)

(72) Inventors: Curtis Asa Foster, Lawrenceville, GA (US); Raymond Samuel Trey Davenport, III, Gillsville, GA (US); Steven Brian Shenker, Cape Town (ZA)

(73) Assignee: Sonin Hybrid, LLC, Atlanta, GA (US)

( * ) Notice: Subject to any disclaimer, the term of this patent is extended or adjusted under 35 U.S.C. 154(b) by 301 days.

(21) Appl. No.: 17/511,979

(22) Filed: Oct. 27, 2021

(65) Prior Publication Data

US 2022/0135241 A1 May 5, 2022

Related U.S. Application Data

(60) Provisional application No. 63/107,692, filed on Oct. 30, 2020.

(51) Int. Cl.
B64U 10/13 (2023.01)
B64D 31/02 (2006.01)
(Continued)

(52) U.S. Cl.
CPC ............ B64U 10/13 (2023.01); B64D 31/02 (2013.01); B64D 31/06 (2013.01); B64D 31/14 (2013.01);
(Continued)

(58) Field of Classification Search
CPC ................................. B64D 31/14; B64D 31/02
See application file for complete search history.

(56) References Cited

U.S. PATENT DOCUMENTS 1,671,865 A 5/1928 Karish
1,718,201 A 6/1929 Brockway
(Continued)

FOREIGN PATENT DOCUMENTS

CA 2799673 A1 * 8/2013 ................ F02C 9/00
CA 2988962 A1 * 6/2018 ............ F01D 25/10
(Continued)

OTHER PUBLICATIONS

Sonin Hybrid Recruit Drone Files at 140 MPH and Stays Airborne for 3 Hours. By Coolthings.com. Dated Sep. 25, 2020. Available online as of [Apr. 20, 2023]. Retrieved from https://www.coolthings.com/sonin-hybrid-recruit-drone-140-mph-and-stays-airborne-for-3-hour-flight-time/ (Year: 2020).
(Continued)

*Primary Examiner* — Marisa V Conlon
(74) *Attorney, Agent, or Firm* — Womble Bond Dickinson (US) LLP

(57) ABSTRACT

Powertrains and related methods for an aerial vehicle may include a torque control system associated with the powertrain and configured to receive torque signals indicative of engine torque supplied by a mechanical power source or generator torque generated by an electric power generation device resisting the engine torque. The torque control system may be configured to generate, based in part on torque signals, a torque control signal configured to change the engine torque or change the generator torque. When torque signals indicate a relative reduction in the engine torque supplied by the mechanical power source, torque control signals may be configured to cause a relative reduction in the generator torque resisting the engine torque. When torque signals indicate a relative increase in the engine torque supplied by the mechanical power source, torque control
(Continued)

signals may be configured to cause a relative increase in the generator torque resisting the engine torque.

18 Claims, 8 Drawing Sheets

(51) Int. Cl.

| | |
|---|---|
| B64D 31/06 | (2024.01) |
| B64D 31/14 | (2006.01) |
| B64U 20/73 | (2023.01) |
| B64U 50/11 | (2023.01) |
| B64U 50/19 | (2023.01) |
| B64U 50/23 | (2023.01) |
| B64U 50/33 | (2023.01) |

(52) U.S. Cl.

CPC .............. *B64U 50/11* (2023.01); *B64U 50/19* (2023.01); *B64U 50/23* (2023.01); *B64U 50/33* (2023.01); *B64U 20/73* (2023.01)

(56) References Cited

U.S. PATENT DOCUMENTS

| | | | |
|---|---|---|---|
| 2,512,823 | A | 6/1950 | Blundell |
| 2,862,680 | A | 12/1958 | Berger |
| 2,864,235 | A | 12/1958 | Paris |
| 2,996,139 | A | 8/1961 | Patterson |
| 3,318,554 | A | 5/1967 | Ward et al. |
| 3,434,280 | A | 3/1969 | Burkhart |
| 3,497,031 | A | 2/1970 | Kedziora |
| 3,669,216 | A | 6/1972 | Spies |
| 3,695,238 | A | 10/1972 | Boerma |
| 4,090,583 | A | 5/1978 | Leonard |
| 4,411,596 | A | 10/1983 | Chilman |
| 4,456,204 | A | 6/1984 | Hapke |
| 4,676,458 | A | 6/1987 | Cohen |
| 4,742,976 | A | 5/1988 | Cohen |
| 4,835,965 | A | 6/1989 | Poehlman |
| 4,991,796 | A | 2/1991 | Peters |
| 5,123,614 | A | 6/1992 | Whitehouse |
| 5,174,719 | A | 12/1992 | Walsh |
| 5,214,253 | A | 5/1993 | Houston, Jr. |
| 5,373,119 | A | 12/1994 | Suzuki |
| 5,484,120 | A | 1/1996 | Blakeley |
| 5,545,860 | A | 8/1996 | Wilkes |
| 6,331,099 | B1 | 12/2001 | Eccles et al. |
| 6,676,379 | B2 | 1/2004 | Eccles et al. |
| 6,903,466 | B1 | 6/2005 | Mercier et al. |
| 7,545,121 | B2 | 6/2009 | Bolduc |
| 7,762,374 | B2 | 7/2010 | Turner |
| 7,789,341 | B2 | 9/2010 | Arlton et al. |
| D648,808 | S | 11/2011 | Seydoux et al. |
| 8,128,019 | B2 | 3/2012 | Annati et al. |
| 8,302,902 | B2 | 11/2012 | Lynas et al. |
| 8,800,605 | B2 | 8/2014 | Barlow et al. |
| 8,855,952 | B2 | 10/2014 | Spierling |
| 8,931,729 | B2 | 1/2015 | Abde Qader Alzu'bi et al. |
| 8,992,161 | B2 | 3/2015 | Hindle et al. |
| 9,217,417 | B2 | 12/2015 | Taneja et al. |
| 9,218,316 | B2 | 12/2015 | Bernstein et al. |
| 9,221,537 | B2 | 12/2015 | Wang et al. |
| D759,764 | S | 6/2016 | Lai |
| 9,527,588 | B1 | 12/2016 | Rollefstad |
| 9,527,600 | B2 | 12/2016 | Russ et al. |
| D784,202 | S | 4/2017 | Park |
| 9,677,564 | B1 | 6/2017 | Woodworth et al. |
| 9,752,718 | B1 | 9/2017 | Wittig |
| 9,764,833 | B1 | 9/2017 | Tighe |
| D798,961 | S | 10/2017 | Li |
| 9,778,660 | B2 | 10/2017 | Von Novak |
| 9,783,294 | B2 | 10/2017 | Johannesson et al. |
| D803,097 | S | 11/2017 | Wang |
| 9,829,886 | B2 | 11/2017 | Yang |
| 9,832,910 | B2 | 11/2017 | Pal |
| 9,834,305 | B2 | 12/2017 | Taylor |
| D808,860 | S | 1/2018 | Tian et al. |
| 9,863,276 | B2 | 1/2018 | Prokup |
| 9,878,800 | B2 | 1/2018 | Russ et al. |
| 9,896,195 | B2 | 2/2018 | Ou |
| 9,902,493 | B2 | 2/2018 | Simon et al. |
| 9,914,537 | B2 | 3/2018 | Wu et al. |
| D814,350 | S | 4/2018 | Joo |
| D814,971 | S | 4/2018 | Huang |
| 9,944,404 | B1 | 4/2018 | Gentry |
| D816,547 | S | 5/2018 | Cu |
| 9,970,526 | B1 | 5/2018 | Bartoli |
| D820,768 | S | 6/2018 | Wang |
| 9,988,159 | B2 | 6/2018 | Russ et al. |
| 9,994,305 | B1 | 6/2018 | Moldovan |
| 10,046,853 | B2 | 8/2018 | Vander Mey |
| D829,283 | S | 9/2018 | Cai |
| D830,281 | S | 10/2018 | Maqbool |
| 10,093,416 | B2 | 10/2018 | Alnafisah |
| 10,093,417 | B2 | 10/2018 | Meringer et al. |
| 10,093,430 | B2 | 10/2018 | Russ et al. |
| 10,099,783 | B1 | 10/2018 | Nilson |
| 10,104,300 | B2 | 10/2018 | Guo |
| 10,113,568 | B2 | 10/2018 | Bannon |
| D854,967 | S | 7/2019 | Yu |
| 10,344,660 | B1 | 7/2019 | Harris |
| D862,359 | S | 10/2019 | Chen et al. |
| 10,538,316 | B2 | 1/2020 | Chen |
| D875,602 | S | 2/2020 | Xu et al. |
| 10,793,284 | B2 | 10/2020 | Prater et al. |
| 11,097,839 | B2 | 8/2021 | Sinha et al. |
| 11,258,333 | B2 | 2/2022 | Cottrell |
| 11,332,256 | B2 * | 5/2022 | Hon ........................ B64D 31/10 |
| 11,479,349 | B2 | 10/2022 | Kuang et al. |
| 11,482,118 | B1 | 10/2022 | Nealy et al. |
| 11,485,488 | B1 | 11/2022 | Armer et al. |
| 11,511,854 | B2 | 11/2022 | Baity et al. |
| D979,454 | S | 2/2023 | Jeong et al. |
| 11,598,960 | B1 | 3/2023 | Auerbach |
| 11,603,193 | B2 | 3/2023 | Kim et al. |
| 11,661,210 | B2 | 5/2023 | D'Arbonneau |
| 11,667,376 | B1 | 6/2023 | Auerbach et al. |
| 11,691,721 | B1 | 7/2023 | Freiheit |
| 11,708,175 | B2 | 7/2023 | Huth et al. |
| 11,719,545 | B2 | 8/2023 | Konrardy et al. |
| 11,731,759 | B2 | 8/2023 | Ol et al. |
| 11,753,144 | B2 | 9/2023 | Tweedt et al. |
| 11,799,162 | B2 | 10/2023 | Zagrodnik et al. |
| 11,803,195 | B2 | 10/2023 | Auerbach et al. |
| 12,202,633 | B2 | 1/2025 | Cai |
| 2002/0030494 | A1 | 3/2002 | Araki et al. |
| 2002/0163251 | A1 | 11/2002 | Crombez et al. |
| 2004/0094662 | A1 | 5/2004 | Sanders, Jr. et al. |
| 2004/0200924 | A1 | 10/2004 | Clark, Jr. et al. |
| 2004/0255884 | A1 | 12/2004 | Arnold |
| 2008/0086247 | A1 | 4/2008 | Gu et al. |
| 2010/0032947 | A1 | 2/2010 | Bevirt |
| 2010/0283253 | A1 | 11/2010 | Bevirt |
| 2010/0308174 | A1 | 12/2010 | Calverley |
| 2012/0231696 | A1 | 9/2012 | Xu |
| 2012/0298790 | A1 | 11/2012 | Bitar |
| 2012/0329593 | A1 | 12/2012 | Larrabee et al. |
| 2013/0105620 | A1 | 5/2013 | Abde Qader Alzu'bi et al. |
| 2014/0129056 | A1 | 5/2014 | Criado |
| 2014/0339371 | A1 | 11/2014 | Yates et al. |
| 2015/0097079 | A1 | 4/2015 | Frolov et al. |
| 2015/0137523 | A1 | 5/2015 | Sia |
| 2015/0232181 | A1 | 8/2015 | Oakley et al. |
| 2016/0000003 | A1 | 1/2016 | Wendte et al. |
| 2016/0001883 | A1 | 1/2016 | Sanz et al. |
| 2016/0023773 | A1 | 1/2016 | Himmelmann et al. |
| 2016/0031564 | A1 | 2/2016 | Yates |
| 2016/0052626 | A1 | 2/2016 | Vander Mey |
| 2016/0214712 | A1 | 7/2016 | Fisher et al. |
| 2016/0214727 | A1 | 7/2016 | Hamel et al. |
| 2016/0221683 | A1 | 8/2016 | Roberts et al. |
| 2016/0253907 | A1 | 9/2016 | Taveira |
| 2016/0325834 | A1 | 11/2016 | Foster et al. |
| 2017/0072812 | A1 | 3/2017 | Von Novak et al. |

(56)　　　References Cited

U.S. PATENT DOCUMENTS

| | | | |
|---|---|---|---|
| 2017/0197700 A1 | 7/2017 | Wainfan | |
| 2017/0208512 A1 | 7/2017 | Aydin et al. | |
| 2017/0225573 A1 | 8/2017 | Waltner | |
| 2017/0260872 A1 * | 9/2017 | Munevar | F01D 21/006 |
| 2017/0297733 A1 | 10/2017 | Zhao | |
| 2018/0050811 A1 | 2/2018 | Niergarth | |
| 2018/0075417 A1 | 3/2018 | Gordon et al. | |
| 2018/0118361 A1 | 5/2018 | Choi et al. | |
| 2018/0233055 A1 | 8/2018 | Damnjanovic et al. | |
| 2019/0100322 A1 | 4/2019 | Schank | |
| 2019/0118943 A1 * | 4/2019 | Machin | B64C 29/02 |
| 2019/0256204 A1 | 8/2019 | Sun et al. | |
| 2020/0062414 A1 * | 2/2020 | Hon | B60W 20/10 |
| 2020/0094694 A1 | 3/2020 | Zhang | |
| 2020/0213517 A1 | 7/2020 | Yin et al. | |
| 2020/0283141 A1 | 9/2020 | Foster | |
| 2021/0094694 A1 * | 4/2021 | Seminel | B64U 50/19 |
| 2021/0095636 A1 * | 4/2021 | Seminel | F02C 7/36 |
| 2021/0114727 A1 | 4/2021 | Foster | |
| 2021/0323691 A1 | 10/2021 | Foster et al. | |
| 2022/0055736 A1 | 2/2022 | Foster et al. | |
| 2022/0055740 A1 | 2/2022 | Foster et al. | |
| 2022/0055765 A1 | 2/2022 | Foster et al. | |
| 2022/0157177 A1 | 5/2022 | Eyhorn | |
| 2022/0169380 A1 | 6/2022 | Mehrgan | |
| 2022/0236745 A1 | 7/2022 | Fagiano | |
| 2022/0285753 A1 | 9/2022 | Rainville et al. | |
| 2023/0303274 A1 | 9/2023 | Foster et al. | |
| 2023/0399115 A1 | 12/2023 | Anderson et al. | |

FOREIGN PATENT DOCUMENTS

| | | | | |
|---|---|---|---|---|
| CA | 3132945 A1 * | 10/2020 | | B64C 27/08 |
| CN | 209195532 U | 8/2019 | | |
| CN | 212177266 U | 12/2020 | | |
| CN | 113503201 A | 10/2021 | | |
| DE | 102018126671 A1 | 4/2020 | | |
| EM | 008160097-0003 | 3/2021 | | |
| KR | 20080042267 | 5/2008 | | |
| KR | 20080068126 A | 7/2008 | | |
| WO | WO2017/131451 A1 | 8/2017 | | |

OTHER PUBLICATIONS

Maltz, William et al., Siemens, Realize Live, The Role of Computational Fluid Dynamics in Drone Design, 2019.
English translation of KR 20080042267 (Year 2008).

* cited by examiner

700

RECEIVE AT LEAST ONE TORQUE SIGNAL INDICATIVE OF ENGINE TORQUE SUPPLIED BY THE MECHANICAL POWER SOURCE AND/OR GENERATOR TORQUE GENERATED BY THE ELECTRIC POWER GENERATION DEVICE RESISTING THE ENGINE TORQUE
702

GENERATE, BASED AT LEAST IN PART ON THE AT LEAST ONE TORQUE SIGNAL, AT LEAST ONE TORQUE CONTROL SIGNAL CONFIGURED TO CHANGE THE ENGINE TORQUE AND/OR CHANGE THE GENERATOR TORQUE
704

WHEN THE AT LEAST ONE TORQUE SIGNAL IS INDICATIVE OF A RELATIVE REDUCTION IN THE ENGINE TORQUE SUPPLIED BY THE MECHANICAL POWER SOURCE, THE AT LEAST ONE TORQUE CONTROL SIGNAL MAY BE CONFIGURED TO CAUSE A RELATIVE REDUCTION IN THE GENERATOR TORQUE RESISTING THE ENGINE TORQUE
706

WHEN THE AT LEAST ONE TORQUE SIGNAL IS INDICATIVE OF A RELATIVE INCREASE IN THE ENGINE TORQUE SUPPLIED BY THE MECHANICAL POWER SOURCE, THE AT LEAST ONE TORQUE CONTROL SIGNAL MAY BE CONFIGURED TO CAUSE A RELATIVE INCREASE IN THE GENERATOR TORQUE RESISTING THE ENGINE TORQUE
708

FIG. 7

SYSTEMS AND METHODS FOR CONTROLLING TORQUE FOR AERIAL VEHICLE

PRIORITY CLAIM

This U.S. non-provisional patent application claims priority to and the benefit of, under 35 U.S.C. § 119(e), U.S. Provisional Application No. 63/107,692, filed Oct. 30, 2020, the disclosure of which is incorporated herein by reference in its entirety.

TECHNICAL FIELD

The present disclosure relates to aerial vehicles, and more particularly, to systems and methods for controlling torque associated with powertrains for aerial vehicles. Other aspects also are described.

BACKGROUND

Multirotor aerial vehicles are often powered by electric motors supplied with electrical power stored in batteries, such as lithium polymer batteries. However, multirotor aerial vehicles relying on electric powertrains are largely incapable of carrying heavier payloads and longer flight durations because batteries and electric motors having a sufficient capacity to lift such heavier payloads and achieve longer flight durations often are heavy and complex, and largely offset any gains in power and flight duration as providing more battery capacity and more powerful electric motors typically adds significant weight to the aerial vehicle. Moreover, this problem is compounded by the inherently inefficient mode of flight of multirotor aerial vehicles as compared to fixed-wing aircraft. Furthermore, as the battery and power capacity of the aerial vehicle is increased, the amount of heat generated by the electrical components of the system also increases, and it becomes challenging to provide sufficient cooling for the electrical components. As a result, the utility of electrically-powered multirotor aerial vehicles generally has been limited to carrying relatively light payloads and short duration flights.

Due to the power density of internal combustion engines, they may provide an alternative to electrically-powered aerial vehicles. However, internal combustion engines may generally produce a power output that fluctuates as a function of crankshaft angle. This may lead to several undesirable characteristics, such as the need for a flywheel to smooth-out operation of the internal combustion engine and reduce vibrations created by the fluctuations. A flywheel increases the weight of the engine and occupies space that might otherwise be available for other components of the aerial vehicle. The added weight decreases efficiency of the engine in particular and the aerial vehicle in general. Accordingly, it can be seen that a need exists for providing power to an aerial vehicle that may address the foregoing and other related, and unrelated, issues and/or problems.

SUMMARY

In view of the foregoing, in one aspect, the present disclosure is directed to a torque control system for aerial vehicles that may at least partially offset fluctuations of the power and torque output of an internal combustion engine, improve the efficiency of the internal combustion engine, increase useful power output, reduce vibrations and associated engine wear, reduce weight associated with flywheels, and/or reduce the likelihood or prevent engine stall.

According to one aspect, a powertrain for an aerial vehicle may include a mechanical power source configured to supply mechanical power and an electric power generation device mechanically coupled to the mechanical power source and configured to convert at least a portion of the mechanical power into electrical power. The powertrain further may include a torque control system associated with the powertrain and configured to receive at least one torque signal indicative of at least one of engine torque supplied by the mechanical power source or generator torque generated by the electric power generation device resisting the engine torque. The torque control system also may be configured to generate, based at least in part on the at least one torque signal, at least one torque control signal configured to at least one of change the engine torque or change the generator torque. In some embodiments, when the at least one torque signal is indicative of a relative reduction in the engine torque supplied by the mechanical power source, the at least one torque control signal may be configured to cause a relative reduction in the generator torque resisting the engine torque. In some embodiments, when the at least one torque signal is indicative of a relative increase in the engine torque supplied by the mechanical power source, the at least one torque control signal may be configured to cause a relative increase in the generator torque resisting the engine torque.

According to a further aspect, an aerial vehicle may include a chassis, a mechanical power source coupled to the chassis and configured to supply mechanical power, and an electric power generation device coupled to the chassis and the mechanical power source and configured to convert at least a portion of the mechanical power into electrical power. The aerial vehicle also may include an electric motor coupled to the chassis and the electric power generation device and configured to convert electrical power into rotational power. The aerial vehicle further may include a first propulsion member coupled to the chassis and the mechanical power source and configured to convert at least a portion of the mechanical power supplied by the mechanical power source into a first thrust force. The aerial vehicle further still may include a second propulsion member coupled to the chassis and the electric motor and configured to convert the rotational power supplied by the electric motor into a second thrust force. The aerial vehicle also may include a torque control system associated with the powertrain and configured to receive at least one torque signal indicative of at least one of engine torque supplied by the mechanical power source or generator torque generated by the electric power generation device resisting the engine torque. The torque control system also may be configured to generate, based at least in part on the at least one torque signal, at least one torque control signal configured to at least one of change the engine torque or change the generator torque. In some embodiments, when the at least one torque signal is indicative of a relative reduction in the engine torque supplied by the mechanical power source, the at least one torque control signal may be configured to cause a relative reduction in the generator torque resisting the engine torque. In some embodiments, when the at least one torque signal is indicative of a relative increase in the engine torque supplied by the mechanical power source, the at least one torque control signal may be configured to cause a relative increase in the generator torque resisting the engine torque.

According to still a further aspect, a method for controlling generator torque generated by an electric power generation device resisting engine torque generated by a mechanical power source coupled to an aerial vehicle may include receiving at least one torque signal indicative of at least one of engine torque supplied by the mechanical power source or generator torque generated by the electric power generation device resisting the engine torque. The method further may include generating, based at least in part on the at least one torque signal, at least one torque control signal configured to at least one of change the engine torque or change the generator torque. In some embodiments, when the at least one torque signal is indicative of a relative reduction in the engine torque supplied by the mechanical power source, the at least one torque control signal is configured to cause a relative reduction in the generator torque resisting the engine torque. When the at least one torque signal is indicative of a relative increase in the engine torque supplied by the mechanical power source, the at least one torque control signal may be configured to cause a relative increase in the generator torque resisting the engine torque.

These and other advantages and aspects of the embodiments of the disclosure will become apparent and more readily appreciated from the following detailed description of the embodiments and the claims, taken in conjunction with the accompanying drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

FIG. 7 is a block diagram of an example method for controlling generator torque generated by an electric power generation device resisting engine torque generated by a mechanical power source according to an aspect of the present disclosure.

DETAILED DESCRIPTION

The following description is provided as an enabling teaching of embodiments of this disclosure. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the embodiments of the invention and not in limitation thereof, since the scope of the invention is defined by the claims.

Figure 1A:
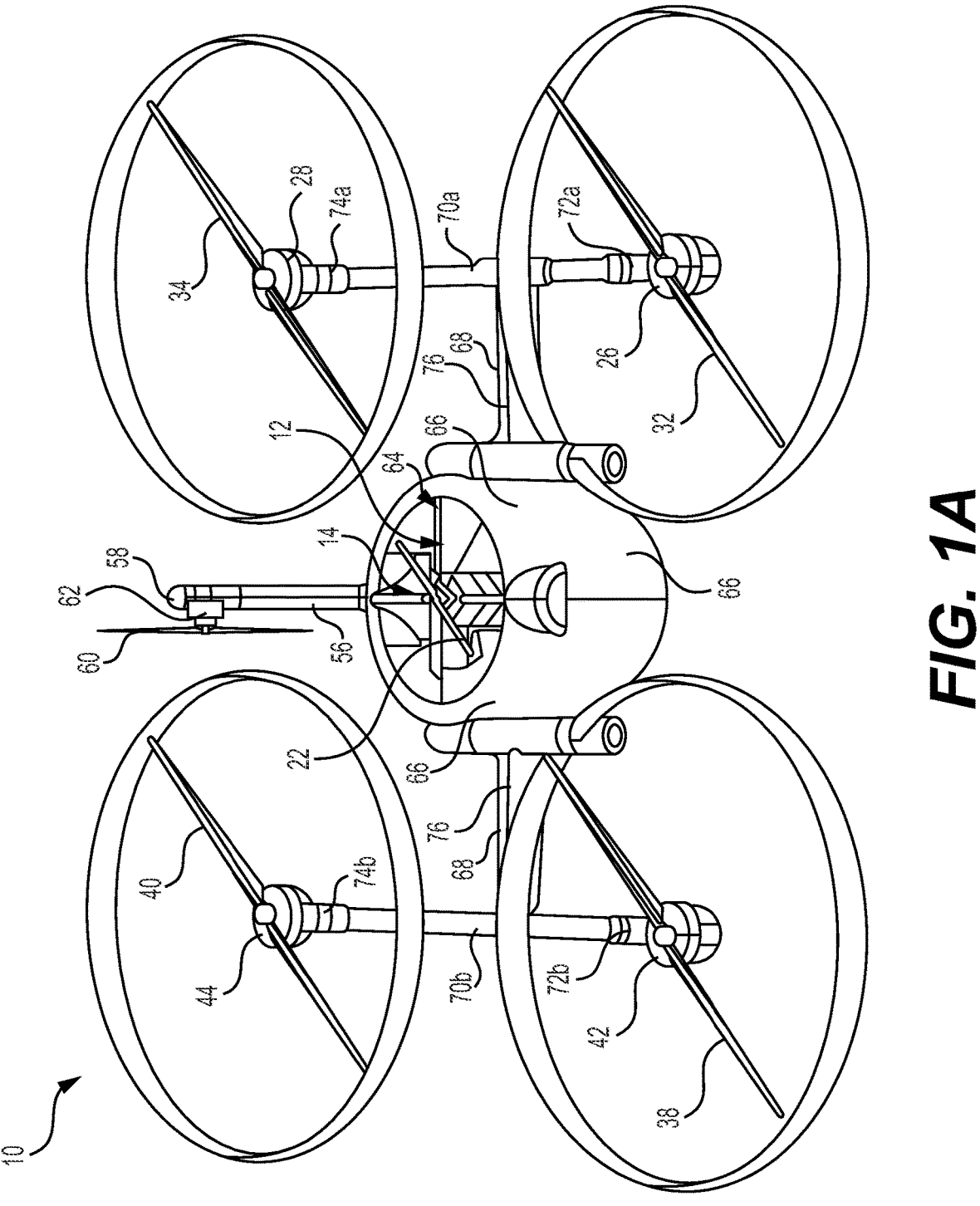
FIG. 1A is a perspective view of an example aerial vehicle according to an aspect of the present disclosure.
Figure 1B:
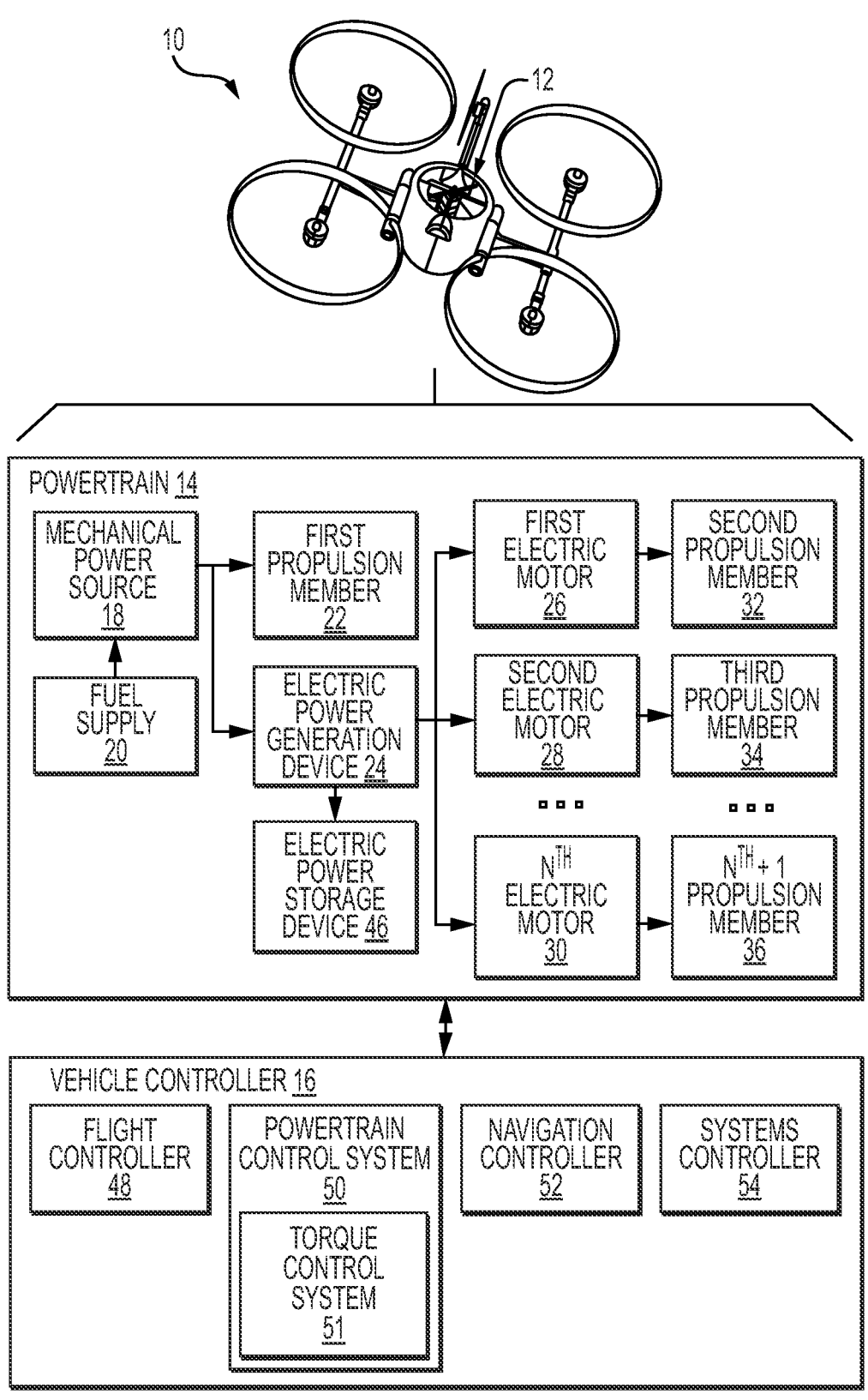
FIG. 1B is a schematic diagram of an example powertrain and an example vehicle controller including a torque control system according to an aspect of the present disclosure

As generally shown in FIGS. 1A and 1B, the present disclosure is directed to an aerial vehicle 10. The example aerial vehicle 10 shown in FIGS. 1A and 1B includes a chassis 12, a powertrain 14 coupled to the chassis 12 and configured to supply power for operation of the aerial vehicle 10, and a vehicle controller 16 configured to control operation of the aerial vehicle 10. As explained in more detail herein, the powertrain 14 and vehicle controller 16 are configured to supply power to the aerial vehicle 10 and control operations associated with the aerial vehicle 10, such as propulsion, maneuvering, and operation of various systems of the aerial vehicle 10.

Although the example aerial vehicle 10 shown in FIGS. 1A and 1B is shown as a multirotor aerial vehicle, the aerial vehicle 10 may be any known type of aerial vehicle. For example, the aerial vehicle 10 may be a fixed-wing aerial vehicle, a duel-rotor aerial vehicle, a vertical take-off and landing vehicle, an aerial vehicle having fixed-wing and multirotor characteristics, a hovercraft, and land-borne vehicle, a water-borne vehicle, etc. The aerial vehicle 10 may be manually controlled via an on-board pilot, and/or can be at least partially remotely controlled, semi-autonomously controlled, and/or autonomously controlled. For example, while the aerial vehicle 10 may be configured to be manually controlled/operated by an on-board pilot, if present, the aerial vehicle 10 generally will be configured to receive control signals from a remote location and be remotely controlled via a remotely located human pilot and/or a remotely located computer-based controller.

In some examples, operations of the aerial vehicle 10 may be controlled entirely by remote control or partially by remote control, i.e. in some embodiments, the aerial vehicle 10 may be configured to be operated remotely during take-off and landing maneuvers, but may be configured to operate semi- or fully-autonomously during maneuvers between take-off and landing. In other embodiments, the aerial vehicle 10 may be an unmanned aerial vehicle that is autonomously controlled, for example, via the vehicle controller 16, which may be configured to autonomously control maneuvering of the aerial vehicle 10 during take-off from a departure location, during maneuvering in-flight between the departure location and a destination location, and during landing at the destination location, for example, without the assistance of a remotely located pilot or remotely located computer-based controller, or an on-board pilot. In some embodiments, the aerial vehicle 10 may be or include a multi-rotor drone, such as drones defined by or similar to Federal Aviation Administration Part 107 or other similar drones.

As shown in FIGS. 1A and 1B, in one embodiment, the example powertrain 14 includes a mechanical power source 18 coupled to the chassis 12 and configured to supply mechanical power to the aerial vehicle 10 for operation. The powertrain 14 shown in FIG. 1B further includes a fuel supply 20, which may include a reservoir for containing fuel and a fuel conduit for providing flow communication between the fuel supply 20 and the mechanical power source 18 for operation of the mechanical power source.

The mechanical power source 18 may be any type of motor, engine, or other driving device that operates by converting energy of the fuel in the fuel supply 20 into a mechanical energy output. For example, the mechanical power source 18 may include any type of internal combustion engine configured to convert any type of fuel into mechanical power, such as a reciprocating-piston engine, a two-stroke engine, a three-stroke engine, a four-stroke engine, a five-stroke engine, a six-stroke engine, a gas turbine engine, a turbofan, a rotary engine, a compression-ignition engine, a spark-ignition engine, a homogeneous-charge compression ignition engine, and/or any other known type of engine. The fuel supply 20 may include any type of fuel that may be converted into mechanical power, such as gasoline, gasohol, ethanol, diesel fuel, bio-diesel fuel, aviation fuel, jet fuel, hydrogen, liquefied-natural gas, propane, nuclear fuel, and/or any other known type of fuel convertible into mechanical power by the mechanical power source 18.

In at least some examples, the mechanical power source 18 and the fuel supply 20 may be selected and/or configured to provide a relatively higher power density as compared a combination of batteries and electric motors. Although only a single mechanical power source 18 is shown in FIG. 1B, the powertrain 14 may include more than one mechanical power source, and the multiple mechanical power sources may be mechanical power sources of the same type or of different types, and/or may be configured to operate using the same type of fuel or different types of fuel.

As shown in FIGS. 1A and 1B, the example powertrain 14 also includes a first propulsion member 22 coupled to the chassis 12 and the mechanical power source 18. The first propulsion member 22 is configured to convert at least a portion of the mechanical power supplied by the mechanical power source 18 into a thrust force. The thrust force may be used to assist the aerial vehicle 10 during take-off, during flight, during maneuvering, and/or during landing. The first propulsion member 22 may include any type of device configured to convert at least a portion of mechanical power supplied by the mechanical power source 18 into a thrust force capable of assisting flight of the aerial vehicle 10. For example, the first propulsion device 22 may include a propeller, an open rotor, and/or a ducted fan mechanically coupled to the mechanical power source 18, for example, via a rotating shaft, and the first propulsion device 22 may be configured to convert power from the rotating shaft into a thrust force.

In the example shown in FIG. 1B, the powertrain 14 also includes an electric power generation device 24 coupled to the chassis 12 and the mechanical power source 18 and configured to convert at least a portion of mechanical power supplied by the mechanical power source 18 into electrical power. In some embodiments, the electric power generation device 24 may include a combination motor-generator configured to convert mechanical torque supplied by the mechanical power source 18 into electrical power and convert electrical power into mechanical torque to supply torque to the mechanical power source 18. In some examples, the motor-generator may include a three-phase DC motor-generator including switching devices, such as MOSFETs and/or IGBTs. For example, the electric power generation device 24 may include a generator mechanically coupled to the mechanical power source 18, for example, via a rotating shaft, and the electrical power generation device 24 may be configured to convert power from the rotating shaft into electrical power for use by other components and devices of the aerial vehicle 10, as explained herein. Although only a single electric power generation device 24 is shown in FIG. 1B, the powertrain 14 may include more than one electric power generation device, and the multiple electric power generation devices may be of the same type or of different types, such as solar-powered and/or wind-powered electric power generation devices.

The example powertrain 14 shown in FIG. 1B also includes one or more electric motors coupled to the chassis 12 and the electric power generation device 24 and configured to convert electrical power into rotational power. The electric power generation device 24 may include one or more electric motors, for example, including a first electric motor 26 and a second electric motor 28 through an $n^{th}$ electric motor 30, with one or more of the first electric motor 26 and the second electric motor 28 through the nth electric motor 30 being coupled to at least one propulsion member. For example, as shown in FIGS. 1A and 1B, the first electric motor 26 may be coupled to a second propulsion member 32 via a drive shaft, the second electric motor 28 may be coupled to a third propulsion device 34 via a drive shaft, and the $n^{th}$ electric motor 30 may be coupled to an $n^{th}+1$ propulsion member 36 via a drive shaft.

In some examples, one or more of the second propulsion member 32 or the third propulsion member 34 through the $n^{th}+1$ propulsion member 36 may be configured to convert at least a portion of the mechanical power supplied by the first electric motor 26 and the second electric motor 28 through the nth electric motor 30 into a respective thrust force. The thrust force may be used to assist the aerial vehicle 10 during take-off, during flight, during maneuvering, and/or during landing. The one or more propulsion members 32, 34, and 36 further may include any type of device configured to convert at least a portion of mechanical power supplied by the respective electric motors into a thrust force capable of assisting flight of the aerial vehicle 10. For example, one or more of the propulsion members 32, 34, and 36 may include a propeller, an open rotor, and/or a ducted fan mechanically coupled to the respective electric motors and configured to generate a thrust force when driven or rotated by their respective electric motors.

The example aerial vehicle 10 shown in FIGS. 1A and 1B includes the first propulsion member 22 coupled to the mechanical power source 18, as well as four propulsion members including the second propulsion member 32, the third propulsion member 34, a fourth propulsion member 38, and a fifth propulsion member 40 coupled respectively to the first electric motor 26, the second electric motor 28, a third electric motor 42, and a fourth electric motor 44. As explained herein, the mechanical power source 18 and the first through fourth electric motors 26, 28, 42, and 44 may be operated in a coordinated manner to cause the aerial vehicle 10 to take-off, maneuver during flight, and land.

As shown in FIG. 1B, the example aerial vehicle 10 also includes the vehicle controller 16, which is in communication with the mechanical power source 18, the electric power generation device 24, and/or one or more of the electric motors 26, 28, 42, or 44. In some embodiments, the vehicle controller 16 may be configured to at least partially control aerial maneuvering of the aerial vehicle 10, such as during selected operations of the aerial vehicle 10, including, but not limited to control of the aerial vehicle 10 or aspects of its operation during take-off, maneuvering during flight, and during landing, by controlling operation of the mechanical power source 18, the electric power generation device 24, and/or one or more of the electric motors 26, 28, 42, or 44.

The vehicle controller 16 may be configured to cause supply of a first portion of the mechanical power from the mechanical power source 18 to the first propulsion member 22 and supply of a second portion of the mechanical power from the mechanical power source 18 to the electric power generation device 24 based at least in part on at least one characteristic associated with maneuvering of the aerial vehicle 10. For example, the vehicle controller 16 may be configured to split mechanical power supplied by the mechanical power source 18 between the first propulsion member 22 and the electric power generation device 24, depending at least in part on the operation of the aerial vehicle 10 at any given moment and/or in an anticipation of future maneuvering.

In some embodiments, such as shown in FIG. 1B, the powertrain 14 may also include an electric power storage device 46 configured to store electric power generated by the electric power generation device 24 for use by any devices of the aerial vehicle 10 that use electric power for operation. The electric power storage device 46 may be any device configured to store electric power, such as one or more batteries of any known type. Electric power stored in the electric power storage device 46 may be used to supply electric power to one of more the electric motors to substitute or supplement electric power supplied by the electric power generation device 24, depending on, for example, the level of charge of the electric power storage device 46 and/or the instantaneous and/or anticipated future electric power requirements of the aerial vehicle 10 for operation and/or maneuvering.

The vehicle controller 16 may also be configured to determine a ratio of the portion of the mechanical power supplied for powering the first propulsion member 22 to the mechanical power supplied to the electric power generation device 24 based at least in part on whether the aerial vehicle 10 lifting off a surface on which the aerial vehicle 10 is supported (e.g., during take-off), hovering while remaining stationary relative to the surface, changing altitude (e.g., ascending or descending), traveling at speed in a given direction, turning, changing pitch, changing roll, and/or changing yaw.

For example, if the aerial vehicle 10 is taking off, a relatively greater portion of the mechanical power supplied by the mechanical power source 18 may be supplied to the first propulsion member 22, as compared to the portion of the mechanical power supplied to the electric power generation device 24. In some circumstances, this may cause the first propulsion member 22 to provide a relatively greater portion of the lift necessary for take-off. If the aerial vehicle

10 has already achieved a desired altitude and is performing a maneuver, such as turning, changing pitch, changing roll, and/or changing yaw, a relatively greater portion of the mechanical power may be supplied to the electric power generation device 24, so that the electric motors and corresponding propulsion members may be used to perform the desired maneuver.

In some aspects, the electric motors may be capable of more quickly responding to control inputs for maneuvering the aerial vehicle 10 due, for example, to an ability of electric motors to more quickly change output speed relative to many types of mechanical power sources, such as some internal combustion engines. Thus, the first propulsion member 22 coupled to the mechanical power source 18 may receive a relatively greater portion of the mechanical power supply during thrust-intensive maneuvers, such as during take-off and while traveling at speed in a given direction. The electric power generation device 24 may also receive a relatively greater portion of the mechanical power supply to supply relatively more electric power to electric motors coupled to the respective propulsion members during maneuvers that are relatively less thrust-intensive, such as during turning, changing pitch, changing roll, and/or changing yaw of the aerial vehicle 10.

As shown in FIG. 1B, the vehicle controller 16 includes a flight controller 48 configured to control maneuvering of the aerial vehicle 10. The vehicle controller 16 may also include a powertrain control system 50 configured to control operation of the mechanical power source 18, the electric power generation device 24, the electric power storage device 46, and/or the flow of power supplied to other powered systems of the aerial vehicle 10, such as the controllers, computing devices, lights, actuators, communications devices, sensors, etc., associated with the aerial vehicle 10.

Figure 2:
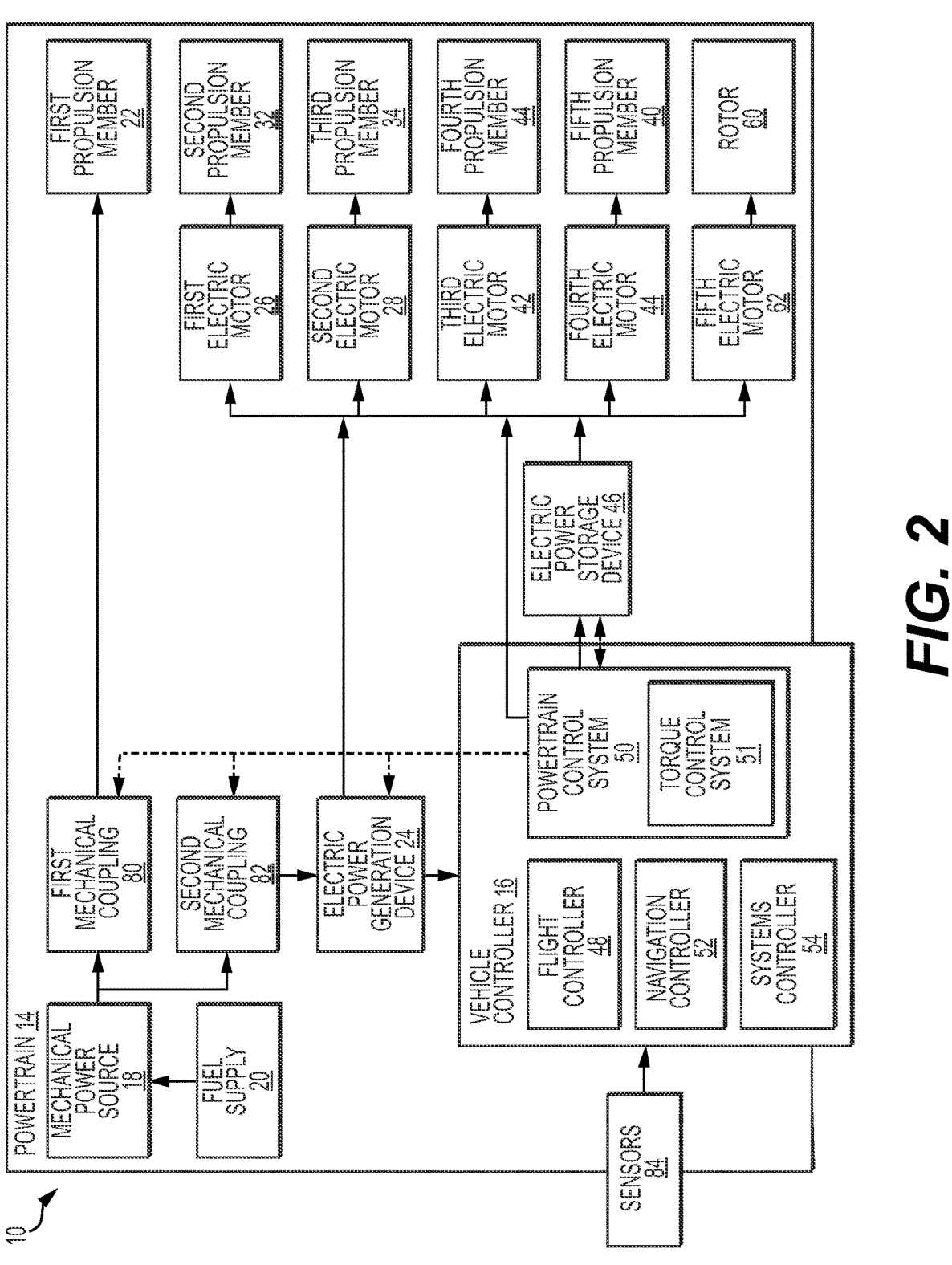
FIG. 2 shows a schematic diagram of a powertrain and a vehicle controller including a torque control system for a vehicle according to another aspect of the present disclosure.

In some embodiments, as shown in FIGS. 1B and 2, the powertrain control system 50 also may include a torque control system 51 associated with the powertrain 14 and configured to control engine torque produced by the mechanical power source 18 and/or generator torque generated by the electric power generation device 24 resisting the engine torque. For example, as explained in more detail herein with respect to FIGS. 4 and 5, the mechanical power source 18 may generally produce a power output and a torque output that fluctuates as a function of the angle of the output shaft of the mechanical power source 18, which as noted previously herein, may result in a number of possible drawbacks. In some embodiments, the torque control system 51 may be configured to mitigate or overcome one or more of these possible drawbacks, as explained in more detail herein with respect to FIGS. 4-6B.

As shown in FIGS. 1B and 2, the vehicle controller 16 may also include a navigation controller 52 configured to receive signals indicative of a location, heading, and/or orientation of the aerial vehicle 10 to assist the flight controller 48 with navigating between a flight departure location and a flight destination. As shown in FIG. 1B, some embodiments of the vehicle controller 16 may also include a system controller 54 configured to control operation of various systems of the aerial vehicle 10, such as operation of non-flight related systems, lights, communications devices, payload deposit actuators, etc.

In some operations, the vehicle controller 16 may be configured to control the supply of mechanical power to the first propulsion member 22 and/or the electric power generation device 24 based at least in part on one or more status factors associated with the aerial vehicle 10. The status factors may include, without limitation, an amount of fuel in the fuel supply 20 carried by the aerial vehicle 10, the weight of the aerial vehicle 10, the payload carried by the aerial vehicle 10, the weight distribution of the aerial vehicle 10, a level of charge of the electric power storage device 46 carried by the aerial vehicle 10, a temperature associated with the mechanical power source 10, an altitude of the aerial vehicle 10, and/or the efficiency of any subsystem or overall operation of the aerial vehicle 10.

In the embodiment shown in FIG. 1A, the aerial vehicle 10 includes a longitudinally extending tail section 56 coupled to a rear portion of the chassis 12 and extending rearward relative to the aerial vehicle 10. The remote end 58 of the tail section 56 includes a rotor 60 and a fifth electric motor 62, which may correspond to one of the electric motors of the powertrain 14, as shown in FIG. 1B. The fifth electric motor 62 may be configured to drive the rotor 60 to at least partially control yaw of the aerial vehicle 10. For example, the rotor 60 may be any type of propulsion device configured to convert power supplied by the fifth electric motor 62 into a thrust force. The vehicle controller 16 (e.g., the flight controller 48) further may be configured to at least partially control maneuvering of the aerial vehicle 10 via operation of the rotor 60, for example, to control yaw of the aerial vehicle 10 during maneuvering.

In some examples, one or more of the first propulsion member 22, the second propulsion member 32, the third propulsion member 34, the fourth propulsion member 38, the fifth propulsion member 40, or the rotor 60 may include one or more propellers, and the one or more propellers may be configured to have adjustable pitch. This may enable tailoring of the amount of thrust provided by one or more of the propulsion members independent of, or in combination with, the speed of rotation of the respective propulsion member, which may enhance control and maneuvering of the aerial vehicle 10 and/or the efficiency of operation of the powertrain 14.

As shown in FIG. 1A, the chassis 12 of some examples of the aerial vehicle 10 may include a structural core 64 configured to support the powertrain 14 and provide a support structure to which other portions of the aerial vehicle 10 are attached. For example, the tail section 56 may be coupled to a rear portion of the core 64. As also shown in FIG. 1A, cover portions 66 may be coupled to the core 64 in part to protect components of the aerial vehicle 10, such as the vehicle controller 16 and various components of the powertrain 14, including the electric power generation device 24 and the electric power storage device 46, as well as other components of the aerial vehicle 10 that may be susceptible to damage by environmental elements. The cover portions 66 may at least partially provide aerodynamic characteristics of the aerial vehicle 10, such as reduced aerodynamic drag and/or additional lift during forward flight.

The example aerial vehicle 10 shown in FIG. 1A also includes a pair of lateral supports 68, each coupled to opposite lateral sides of the core 64 of the chassis 12. Respective remote ends of the example lateral supports 68 are each coupled to an intermediate portion of a respective longitudinal rotor beam 70a and 70b configured to support one or more electric motor and propulsion device pairs. For example, as shown in FIG. 1A, a first of one of the lateral rotor beams 70a supports at a forward end 72a, the first electric motor 28 and second propulsion member 32 pair, and at a rearward end 74a, the second electric motor 28 and third propulsion member 34 pair. A second one of the lateral rotor beams 70b supports at a forward end 72b, the third electric motor 42 and fourth propulsion member 38 pair, and at a rearward end 74b, the fourth electric motor 44 and fifth propulsion member 40 pair.

In some embodiments, the lateral supports 68 and the rotor beams 70a and 70b include electric power links to supply electrical power to the first through fourth electric motors 26, 28, 42, and 44 from one or more of the electric power generation device 24, the electric power storage device 46, or the powertrain control system 50. The lateral supports 68 and the rotor beams 70a and 70b may further include communications links configured to transmit/supply control signals for controlled operation of the first through fourth electric motors 26, 28, 42, and 44 from the flight controller 48 and/or the powertrain control system 50, and provide feedback, such as power levels, position data, and other operational information to the vehicle controller 16. The communications links may be hard-wired and/or wireless.

The tail section 56 may also include an electrical power link to supply electric power to the fifth electric motor 62 for operation of the rotor 60 from one or more of the electric power generation device 24, the electric power storage device 46, or the powertrain control system 50. In addition, the tail section 56 may include a communications link to supply control signals for controlled operation of the fifth electric motor 62 coupled to the rotor 60 from the flight controller 48 and/or the powertrain control system 50, and which may receive/transmit feedback, such as power levels, position data, and other operational information to the vehicle controller. The communications link to the fifth electric motor 62 may be hard-wired and/or wireless.

As shown in FIG. 1A, each of the lateral supports 68 may support a respective control surface 76 configured to assist with control of maneuvering of the aerial vehicle 10, for example, during forward flight in a manner at least similar to the control surfaces of a fixed-wing aircraft. The lateral supports 68 may each include (or house) one or more actuators 78 (see, e.g., FIGS. 3 and 6) configured to control orientation of the control surfaces 76, either together or independently of one another. The flight controller 48 may be configured to communicate control signals to one or more of the actuators 78 via hard-wired and/or wireless communication links. In some embodiments, the actuators 78 may be electric actuators (e.g., motors and/or linear actuators) configured to be activated via electrical power supplied by the powertrain 14, for example, by one or more of the electric power generation device 24, the electric power storage device 46, or the powertrain control system 14. Other types of actuators are contemplated, such as hydraulic actuators and/or mechanical actuators.

FIG. 2 shows a schematic diagram of an example powertrain 14 and an example vehicle controller 16. As shown in FIG. 2, the example powertrain 14 includes a first mechanical coupling 80 coupling the mechanical power source 18 and the first propulsion member 22 to one another. In addition, the example powertrain 14 also includes a second mechanical coupling 82 coupling the mechanical power source 18 and the electric power generation device 24 to one another.

The first mechanical coupling 80 and/or the second mechanical coupling 82 may generally be configured to facilitate alteration or modification of the mechanical power transferred from the mechanical power source 18 to the first propulsion member 22 and the portion of the mechanical power from the mechanical power source 18 to the electric power generation device 24. For example, the first mechanical coupling 80 and/or the second mechanical coupling 82 may be configured to alter the ratio of the portion of the mechanical power transferred to the first propulsion member 22 to the portion of the mechanical power transferred to the electric power generation device 24. The vehicle controller 16 (e.g., the powertrain control system 50) may also be configured to communicate control signals to the first mechanical coupling 80 and/or the second mechanical coupling 82 to control the ratio based on, for example, one or more characteristics associated with maneuvering of the aerial vehicle 10 and/or one or more status factors associated with the aerial vehicle 10.

In some embodiments, the first mechanical coupling 80 and/or the second mechanical coupling 82 may include a clutch and/or a transmission configured to transfer torque from the mechanical power source 18 to the first propulsion member 22 and/or the electric power generation device 24, respectively. The first mechanical coupling 80 and/or the second mechanical coupling 82 may also include an electrically actuated clutch, a pneumatically actuated clutch, or a hydraulically actuated clutch.

In addition, or alternatively, the first mechanical coupling 80 may include a transmission configured to convert an input speed into an output speed, and control a ratio of the rotational speed of the mechanical power source 18 to the rotational speed of the first propulsion member 22. This may serve to help improve the efficiency, control, and/or operation of the first propulsion member 22 and/or the mechanical power source 18, for example, because the mechanical power source 18 and the first propulsion member 22 may need to be operated at rotational speeds different from one another to achieve the desired flight and maneuvering of the aerial vehicle 10.

The second mechanical coupling 82 may also include a transmission configured to convert an input speed into an output speed, and control a ratio of the rotational speed of the mechanical power source 18 to the rotational speed of the electric power generation device 24. This may serve to help improve the efficiency, control, and/or operation of the electric power generation device 24 and/or the mechanical power source 18, for example, because the mechanical power source 18 and the electric power generation device 24 may need to be operated at rotational speeds different from one another to achieve the desired electric power generation for the powertrain 14 and operation of the aerial vehicle 10. In examples including one or more transmissions, the one or more transmissions may include at least one of a continuously variable transmission, a planetary gear train, or a belt drive.

The mechanical power source 18 may further include a first drive shaft coupling the mechanical power source 18 to the first propulsion member 22, and a second drive shaft coupling the mechanical power source 18 to the electric power generation device 24. The first drive shaft may extend in a first direction relative to the mechanical power source 18, and the second drive shaft extends in a second direction relative to the mechanical power source 18 opposite the first direction. For example, the first drive shaft may extend from a first end of the mechanical power source 18, e.g., upward, and the second drive shaft may extend from a second opposite end of the mechanical power source 18, e.g., downward. The first drive shaft and the second drive shaft may be common or coupled to one another.

In some embodiments, the first drive shaft or the second drive shaft may be hollow, and the other of the first drive shaft or the second drive shaft extends at least partially through the hollow drive shaft. In some such examples, the first propulsion member 22 and the electric power generation device 24 may be on the same end of the mechanical power source 18, for example, such that the electric power generation device 24 is located between the mechanical power source 18 and the first propulsion member 22. In some examples, the powertrain 14 may also include power take-off shaft coupled to the mechanical power source 18 and configured to couple the mechanical power 18 source to one or more of the first propulsion member 22, the second propulsion member 32, or another device or component of the aerial vehicle 10 that is operable via mechanical power supplied by the mechanical power source 18.

As shown in FIG. 2, the aerial vehicle 10 may include one or more sensors 84 configured to generate at least one operational signal indicative of at least one operational condition associated with operation of the aerial vehicle 10. For example, the at least one operational signal may be indicative of at least one of a location of the aerial vehicle 10, motion of the aerial vehicle 10 (e.g., heading, speed, and/or orientation of the aerial vehicle 10), at least one object in an environment surrounding the aerial vehicle 10, the weight of the aerial vehicle 10, the weight distribution of the aerial vehicle 10, the weight of a payload carried by the aerial vehicle 10, an amount of fuel in the fuel supply 20 carried by the aerial vehicle 10, or any other condition related to the aerial vehicle 10.

The vehicle controller 16 (e.g., the powertrain control system 50) may be configured to receive one or more operational signals from the sensors 84 and cause supply of a portion of the mechanical power to the first propulsion member 22 and/or supply of a portion of the mechanical power to the electric power generation device 24 based at least in part on the signals. For example, a ratio of the mechanical power supplied to the first propulsion member 22 to the mechanical power supplied to the electric power generation device 24 may be altered based at least in part on one or more of the signals. In some examples, the vehicle controller 16 (e.g., the flight controller 48) may be configured to receive one or more of the signals and at least partially control aerial maneuvering of the aerial vehicle 10 based at least in part on the one or more signals.

In some examples, the vehicle controller 16 (e.g., the navigation controller 52) may be configured to receive the one or more signals from the sensors 84 and cause the aerial vehicle 10 to take-off, maneuver to a destination, and/or land based at least in part on the one or more signals. For example, the sensors 84 may include a global positioning system (GPS) receiver, accelerometers, gyroscopes, and/or inertial measurement units configured to generate signals received by the navigation controller 52, which may determine the position, velocity, heading, and/or orientation of the aerial vehicle 10, and communicate with the flight controller 48, so that the flight controller 48 can communicate with the powertrain 14 to cause the aerial vehicle 10 to maneuver to the destination.

In some further examples, the sensors 84 may include one or more imagers, one or more light detection and ranging (LIDAR) sensors, one or more radio detection and ranging (RADAR) sensors, and/or one or more sound navigation and ranging (SONAR) sensors, or the like configured to detect objects in the environment surrounding the aerial vehicle 10. The vehicle controller 16 (e.g., the navigation controller 52) may be configured to receive one of more such signals and cause the aerial vehicle 10 to take-off, maneuver to a destination, avoid obstacles, and/or land based at least in part on the one or more operational signals from the sensors 84.

Figure 3:
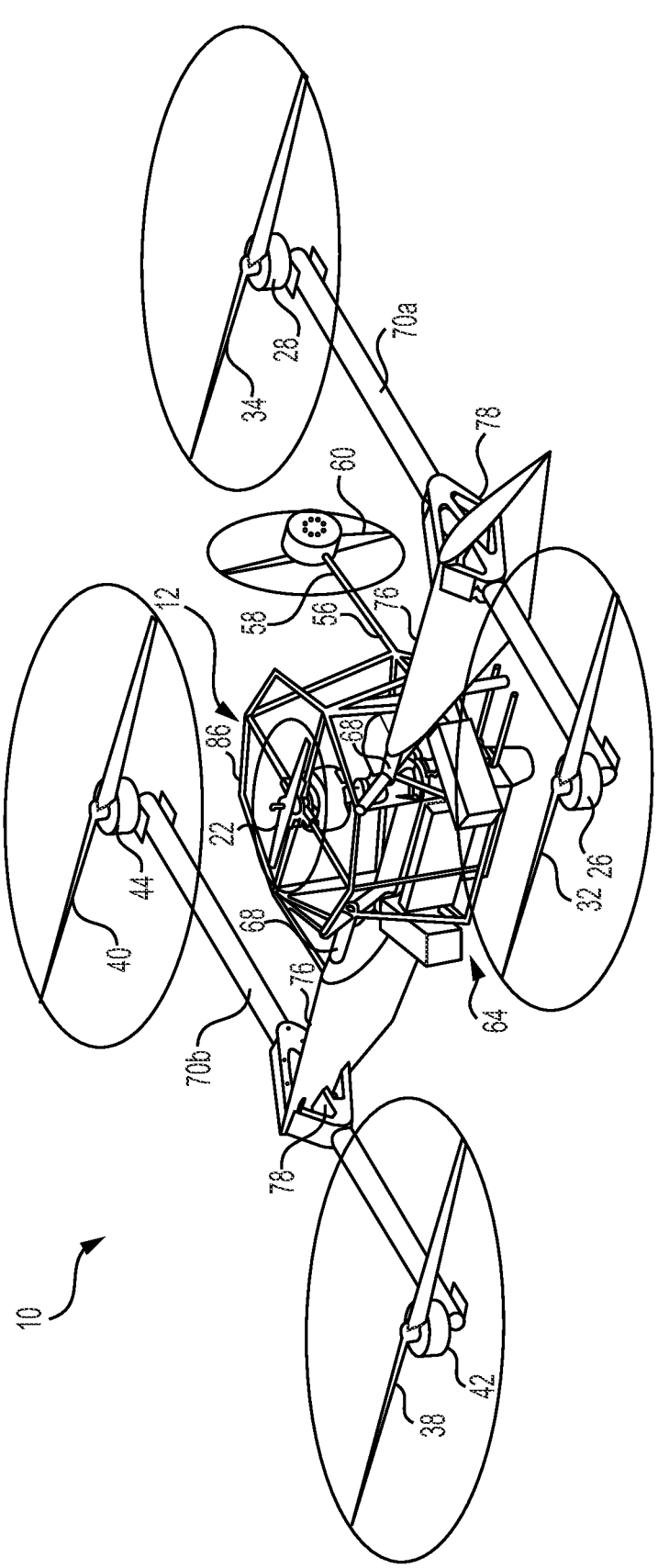
FIG. 3 shows an overhead perspective view of an aerial vehicle with cover portions removed to reveal an example chassis of the aerial vehicle according to a further aspect of the present disclosure.

FIG. 3 shows an overhead perspective view of an example aerial vehicle 10 with the cover portions 66 (see FIG. 1A) removed to reveal an example chassis 12 of the aerial vehicle 10 according to a further aspect of the present disclosure. As shown in FIG. 3, the chassis 12 includes a plurality of frame members 86 forming the core 64 of the chassis 12. In some examples, the chassis 12 may include a monocoque instead of, or in addition to, the frame members 86. In the example shown, the lateral supports 68 are coupled to frame members 86 of the chassis 12 and extend laterally away from the core 64, each supporting a respective control surface 76. The remote ends of the lateral supports 68 are coupled to the respective rotor beams 70a and 70b, and the actuators 78 configured to control operation of the control surfaces 76 are located at the remote ends of the lateral supports 68. In some examples, the actuators 78 may be located at the in-board ends of the lateral supports 68 and/or between the remote ends and the in-board ends of the lateral supports 68.

In some examples, one or more of the propulsion members may be coupled to the aerial vehicle 10, such that the orientation of the one or more propulsion members may be altered with respect to the chassis 12. This configuration may provide greater control of operation of the aerial vehicle 10, for example, by facilitating a change in direction of the thrust force of the respective propulsion member. In such examples, the aerial vehicle 10 may include actuators configured to alter the orientation of the propulsion members, and the vehicle controller 16 (e.g., the powertrain control system 50 and/or the flight controller 52) may be configured to cause these actuators to alter the orientation of the propulsion members to assist with achieving desired maneuvers.

In addition, one or more movable vanes may be associated with one or more of the propulsion members. The one or more movable vanes may be configured to affect the direction of the thrust force associated with operation of the propulsion members. Such examples may provide greater control of operation of the aerial vehicle 10, for example, by facilitating a change in direction of the thrust force of the propulsion member. In such examples, the aerial vehicle 10 may include actuators configured to alter the orientation movable vanes, and the vehicle controller 16 (e.g., the powertrain control system 50 and/or the flight controller 52) may be configured to cause the movable vane actuators to alter the orientation of the movable vanes to assist with achieving desired maneuvers.

As referenced above, some embodiments of the powertrain control system 50 also may include the torque control system 51, which may be associated with the powertrain 14 and may be configured to control engine torque produced by the mechanical power source 18 and/or generator torque generated by the electric power generation device 24 resisting the engine torque. For example, as explained in more detail herein with respect to FIGS. 4 and 5, the mechanical power source 18 may generally produce a power output and a torque output that fluctuates as a function of the angle of the output shaft of the mechanical power source 18, which as noted previously herein, may result in a number of possible drawbacks. In some embodiments, the torque control system 51 may be configured to mitigate or overcome one or more of these possible drawbacks, as explained in more detail herein with respect to FIGS. 4-6B.

Figure 4:
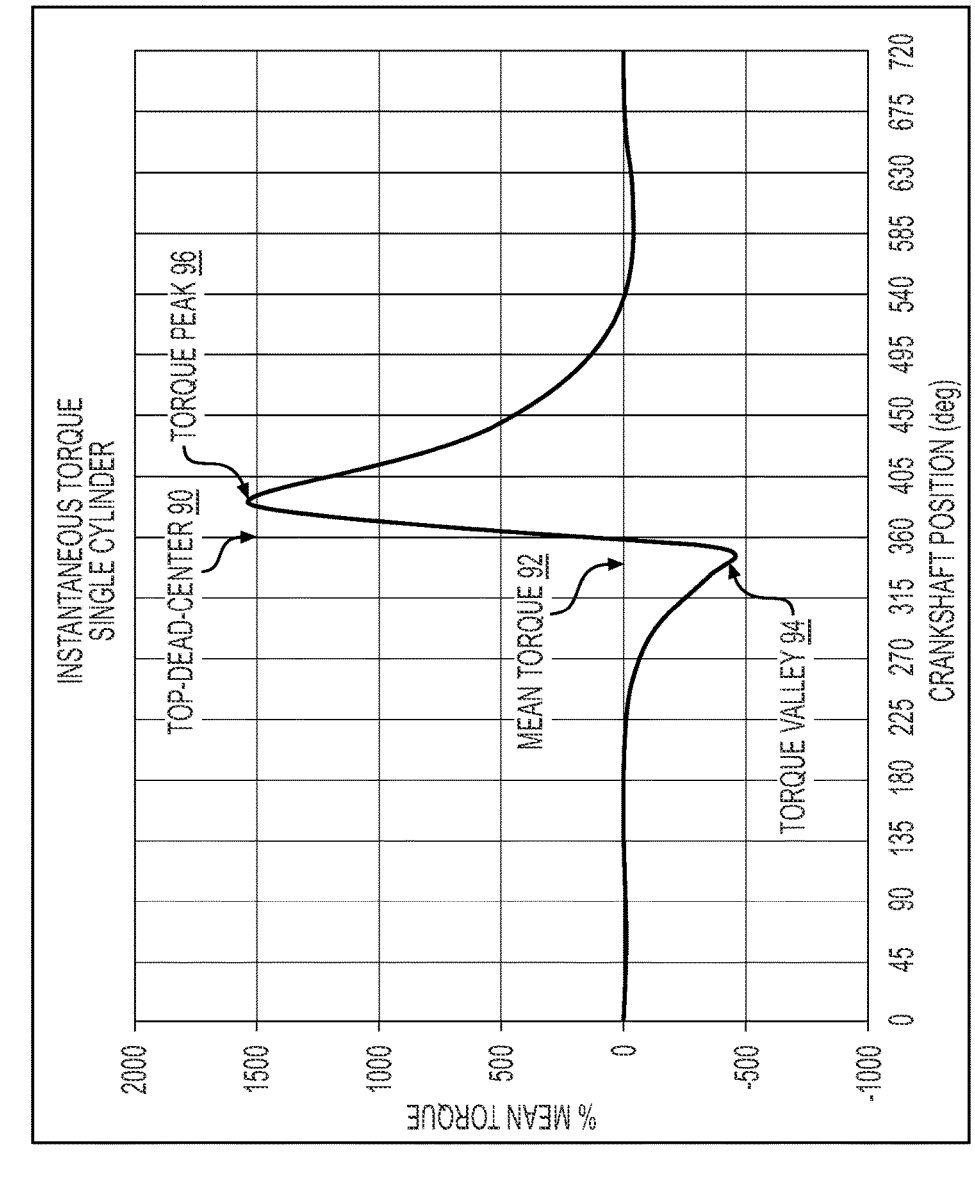
FIG. 4 shows a graph for an example single-cylinder four-stroke engine of the percentage of mean average torque output of the engine as a function of crankshaft position (degrees), highlighting torque output fluctuation of the engine as the crankshaft rotates through 720 degrees.

FIG. 4 shows a graph 88 for an example single-cylinder four-stroke engine of the percentage of mean average torque output of the engine as a function of crankshaft position (degrees), highlighting torque output fluctuation as the crankshaft rotates through 720 degrees. As shown in FIG. 4, as the crankshaft of the engine rotates through two complete revolutions (i.e., 720 degrees), because the engine is a four-stroke engine, the combustion chamber and piston experience one combustion event generally corresponding to the piston being at top-dead-center 90 of the cylinder, which generally corresponds to a crankshaft position or angle of about 360 degrees as shown, following a compression stroke compressing an air-fuel mixture in the cylinder. Because compressing the air-fuel mixture requires torque, the percentage of mean average torque prior to top-dead-center 90 is negative, thus requiring work. As shown, relative to the mean torque 92, this work is shown in FIG. 4 as a torque valley 94. As shown in FIG. 4, shortly after top-dead-center 90, the combustion event occurs, which produces torque, beginning generally at the top-dead-center 90 and up to a peak torque 96. Thus, graph 88 of FIG. 4 provides an example highlighting the fluctuating nature of torque produced (or consumed) by the cylinder of the engine during operation. For a two-stroke engine, this example torque behavior shown in FIG. 4 would occur over 360 degrees instead of 720 degrees. Although engines having multiple cylinders may even out such fluctuations, reducing the torque peaks and valleys, the fluctuations may still occur, and engines having multiple cylinders are more complex and generally heavier. Although flywheels may also even out such fluctuations, they add weight to the engine and occupy volume that might be used for other components or, in the case of an aerial vehicle, allow for a more aerodynamically advantageous design.

Figure 5:
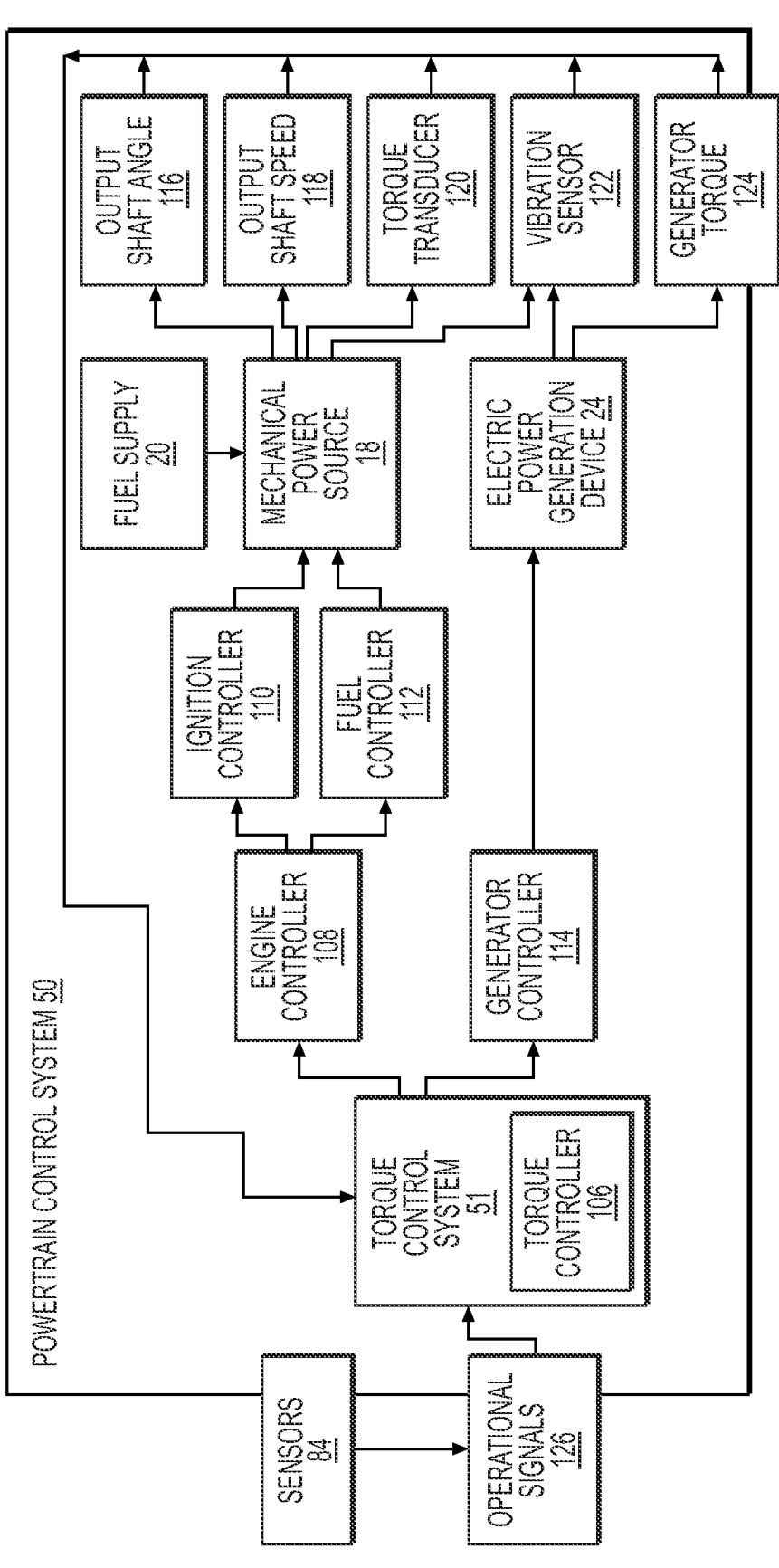
FIG. 5 shows a schematic diagram of an example powertrain control system including an example torque control system for a vehicle according to another aspect of the present disclosure.

FIG. 5 shows a schematic diagram of an example powertrain control system 50 including an example torque control system 51 for an aerial vehicle 10, according to another aspect of the present disclosure. As shown in FIG. 5, the example powertrain control assembly 50 may include the torque control system 51 associated with the powertrain 14, and the torque control system 51 may be configured to receive at least one torque signal indicative of engine torque supplied by the mechanical power source 18 and/or generator torque generated by the electric power generation device 24 resisting the engine torque. In some embodiments, the torque control system 51 also may be configured to generate, based at least in part on the at least one torque signal, at least one torque control signal configured to at least one of change the engine torque or change the generator torque. For example, when the at least one torque signal is indicative of a relative reduction in the engine torque supplied by the mechanical power source 18, the at least one torque control signal may be configured to cause a relative reduction in the generator torque resisting the engine torque. When the at least one torque signal is indicative of a relative increase in the engine torque supplied by the mechanical power source 18, the at least one torque control signal may be configured to cause a relative increase in the generator torque resisting the engine torque. Relative to the example torque behavior shown in FIG. 4, this may serve to at least partially offset the torque valley 94 and/or at least partially offset the peak torque 96. Thus, by controlling the generator torque resisting the engine torque, possible drawbacks associated with torque fluctuations of the mechanical power source 18 during operation may be mitigated or at least partially eliminated.

In some embodiments, the electric power generation device 24 may include a combination motor-generator configured to (1) convert mechanical torque supplied by the mechanical power source 18 into electrical power, and (2) convert electrical power into mechanical torque to supply torque (or reduce the resisting torque) to the mechanical power source 18. Thus, in some embodiments, by controlling operation of the electric power generation device 24, the torque of the electric power generation device 24 resisting the torque supplied by the mechanical power source 18 may be controlled to at least partially offset the fluctuation in torque supplied by the mechanical power source 18.

Figure 6A:
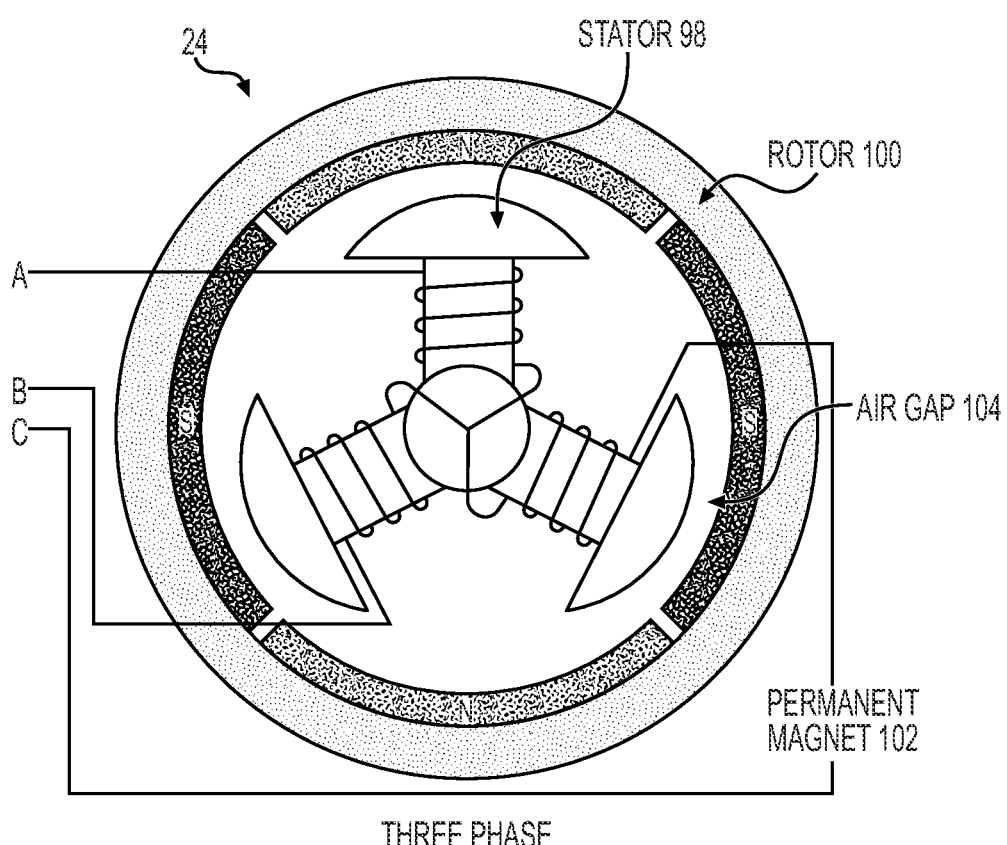
FIG. 6A shows a schematic diagram of an example electric power generation device for an aerial vehicle according to another aspect of the present disclosure.
Figure 6B:
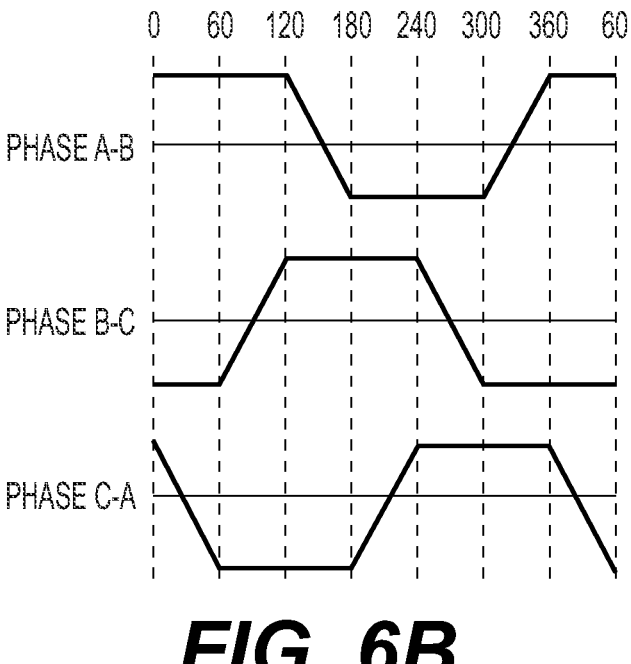
FIG. 6B is a graph showing phase voltages for the electric power generation device of FIG. 6A as a function of crankshaft position (degrees) according to a further aspect of the present disclosure.

For example, FIG. 6A shows a schematic diagram of an example electric power generation device 24 for an aerial vehicle 10 according to another aspect of the present disclosure. As shown in FIG. 6A, electrical power generation device 24 may include a three-phase DC motor-generator including switching devices, such as MOSFETs and/or IBGTs. The DC motor may include a stator 98 and windings A, B, and C, as well as a rotor 100 having an interior including permanent magnets 102, with an air gap 104 between the permanent magnets 102 and the stator 98. FIG. 6B is a graph showing phase voltages for the electric power generation device of FIG. 6A as a function of engine crankshaft position (degrees) according to a further aspect of the present disclosure.

In some embodiments, the electric power generation device 24 may be associated with one or more electric power storage devices 46 (see FIG. 2) (e.g., one or more batteries) and may include a DC motor and a plurality if switches (e.g., MOSFETs or IGBTs), the operation of which may be managed by the torque control system 51. In some examples, a three-phase DC motor may be driven and rotated by applying a voltage across one of its three phases, thereby acting to supply positive torque to perform work, such as supplying torque to the mechanical power source 18, for example, as explained below.

Alternatively, when the DC motor is being driven, for example, by the mechanical power source 18 or another source of torque, the DC motor may be controlled to generate a back voltage (e.g., EMF) across the three phases, which may serve to convert mechanical torque into electrical power, thereby acting as an electrical power generator. For example, the DC motor may be driven by the mechanical power source 18, and the torque control system 51 may control operation of the switches (e.g., MOSFETs or IGBTs), for example, via pulse width modulation or frequency modulation, to rectify the back voltage generated by the DC motor phases to a DC voltage having a value higher than the electric power storage devices 46, thus increasing the charge of the one or more electric power storage devices 46. This results in the electric power generation device 24 applying a negative torque resisting torque supplied by the mechanical power source 18, and thus, a negative current flows to the one or more electric power storage devices 46, an amount of which may be controlled and/or modulated by at least some embodiments of the torque control system 51.

Referring to FIG. 5, in some embodiments, the torque control system 51 may include a torque controller 106, which may be configured to receive the at least one torque signal indicative of engine torque supplied by the mechanical power source 18 and/or the generator torque associated with operation of the electric power generation device 24 resisting the engine torque. Based at least in part on the one or more torque signals, the torque controller 106 may be configured to generate at least one torque control signal configured to change the engine torque and/or change the generator torque.

In some embodiments, the powertrain control system 50 may also include an engine controller 108 configured to at least partially control operation of the mechanical power source 18. For example, the engine controller 108 may be configured to receive one or more torque control signals, for example, from the torque controller 106, and control, based at least in part on the one or more torque control signals, output of the mechanical power source 18. In some embodiments, the engine controller 108 may be configured to at least partially control output of the mechanical power source 18 by generating at least one engine control signal, which may include one or more ignition timing signals generated, for example, by an ignition controller 110, and configured to at least partially control timing of an ignition of combustion in the mechanical power source 18. For example, by advancing or retarding the ignition timing, relative to top-dead-center of the piston, the power and torque output, and/or the timing thereof, of the mechanical power source 18 may be controlled. In some embodiments, the engine control signal may include one or more fuel control signals generated by a fuel controller 112 and configured to at least partially control operation of at least one of a carburetor (e.g., by actuating a linkage controlling the carburetor) or a fuel injector (e.g., a pulse signal) of the mechanical power source 18. For example, by controlling the flow of fuel to the combustion chamber of the mechanical power source 18, the power and torque output of the mechanical power source 18 may be controlled.

In some embodiments, the powertrain control system 50 may also include a generator controller 114 configured to at least partially control operation of the electric power generation device 24. For example, the generator controller 114 may be configured to receive the one or more torque control signals from the torque controller 106 and, based at least in part on the torque control signal(s), control the generator torque resisting the engine torque supplied by the mechanical power source 18. For example, if the torque signal(s) is/are indicative of a relative reduction in the engine torque supplied by the mechanical power source 18, the one or more torque control signals may be configured to control at least one of the switches of the electric power generation device 24, such as MOSFETs of the electric power generation device 24 or IGBTs of the electric power generation device 24, to reduce the generator torque resisting the engine torque supplied by the mechanical power source 18. This may serve to at least partially offset the torque valley (see FIG. 4) occurring prior to top-dead-center of the piston of the mechanical power source 18.

In some embodiments, if the torque signal(s) is/are indicative of a relative increase in the engine torque supplied by the mechanical power source 18, the one or more torque control signals may be configured to control at least one of the switches of the electric power generation device 24, such as MOSFETs of the electric power generation device 24 or IGBTs of the electric power generation device 24, to increase the generator torque resisting the engine torque supplied by the mechanical power source 18. This may serve to take advantage of the peak torque (see FIG. 4) occurring just after top-dead-center of the piston of the mechanical power source 18. In some embodiments, increasing negative torque resisting the engine torque immediately after ignition or top-dead-center may delay opening of an exhaust port of the mechanical power source 18 and allow a relatively more complete fuel burn during combustion. This may promote an increase in power output and/or fuel efficiency of operation of the mechanical power source 18. This may also serve to at least partially offset the effects of the peak torque occurring following top-dead-center of the piston of the mechanical power source 18.

In some embodiments, when the at least one torque signal is indicative of a relative reduction in the engine torque indicative of the mechanical power source 18 ceasing operation, the at least one torque control signal may be configured to cause the electric power generation device 24 to supply torque to the mechanical power source 18 to prevent the mechanical power source 18 from ceasing operation (e.g., stalling) or restarting operation of the mechanical power source 18 if its operation has already ceased. Thus, in some examples, the electric power generation device 24 may be controlled to supply torque to the mechanical power source 18 to restart the mechanical power source 18 or prevent it from stalling, for example, if the powertrain control system 50 detects that the mechanical power source 18 has stalled or is about to stall. This may increase reliability of operation of the mechanical power source 18, which may be desirable for an aerial vehicle.

In some embodiments, the torque controller 106 may be configured to receive at least one signal indicative of an output shaft angle 116 of an output shaft (e.g., a crankshaft) of the mechanical power source 18. For example, the powertrain control system 50 may include a transducer configured to generate one or more signals indicative of the output shaft angle 116, which may include a rotary encoder configured to provide an analog and/or digital feedback indicative of the output shaft angle 116. In some examples, a Hall sensor may be used to detect each rotation of the output shaft and may allow for an approximation of output shaft angle and/or output shaft speed 118. Other transducers are contemplated for generating signals indicative of the output shaft angle 116 and/or the output shaft speed 118. In some embodiments, the output shaft angle 116 may be approximated based on voltage measurements of the windings A, B, and/or C (see FIG. 6B) of the electric power generation device 24. For example, the output shaft angle 116 of the mechanical power source 18 may be measured to an about sixty-degree resolution by comparing the differences between phase voltages over a 360-degree rotation of an input/output shaft of the electric power generation device 24. A combination of transducer types may be used to determine or approximate the output shaft angle 116 and/or the output shaft speed 118.

In some examples, when it has been determined, based at least in part on the one or more signals indicative of the output shaft angle 116, that the output shaft angle 116 is within a predetermined range of angles after an angle corresponding to top-dead-center of the piston (e.g., from about 1 degree to about 45 degrees), the torque controller 106 may be configured to generate, based at least in part on the determination, at least one torque control signal configured to cause a relative increase in the generator torque resisting the engine torque. As noted above, this may take advantage of the peak torque produced by the mechanical power source 18 to generate more electric power and/or at least partially offset the peak torque.

In some embodiments, the torque controller 106 may be configured to receive at least one ignition signal indicative of an ignition of combustion in the mechanical power source 18. Based at least in part on the at least one ignition signal, the torque controller 106 may be configured to generate at least one torque control signal configured to cause a relative increase in the generator torque resisting the engine torque. In some examples the ignition signal may be indicative of the output shaft angle 116 and/or output shaft speed 118, and thus, the ignition signal may be used, either alone or in combination with other signals to approximate the output shaft angle 116 and/or output shaft speed 118.

In some embodiments, the torque controller 106 may be configured to determine whether the output shaft angle 116 is within a predetermined range of angles corresponding to the piston before or approaching top-dead-center (e.g., from about 1 degree to about 45 degrees). Based at least in part on such a determination, the torque controller 106 may be configured to generate at least one torque control signal configured to cause a relative decrease in the generator torque resisting the engine torque. The predetermined range of angles corresponding to the piston before or approaching top-dead-center may correspond to the torque valley (see FIG. 4), and thus, decreasing in the generator torque resisting the engine torque at the predetermined range of output shaft angles may at least partially offset the effects of the torque valley.

In some embodiments, the torque supplied (or consumed in the torque valley) may be determined by a torque transducer 120 configured to directly measure the torque, for example, such as one or more strain gauges or other types of transducers that may be coupled to the output shaft to measure engine torque.

In some embodiments, the torque controller 106 may be configured to receive at least one vibration signal, for example, from a vibration sensor 122, indicative of an amplitude of vibration associated with operation of the mechanical power source 18 and/or a frequency of vibration associated with operation of the mechanical power source 18. Based at least in part on the at least one vibration signal, the torque controller 106 may generate at least one torque control signal configured to alter operation of the mechanical power source 18 and/or control the generator torque 124 resisting the engine torque to reduce vibration associated with operation of the mechanical power source 18 (e.g., the amplitude and/or frequency of vibration. In some embodiments, the powertrain 14 may be reactive and/or tuned according to operating conditions to dampen vibrations and/or absorb peak forces for the mechanical power source 18 and/or the powertrain 14 as a whole. Such embodiments may operate according to either a closed-loop or open-loop control strategy, which may be integrated into the powertrain control system 50. In some embodiments, jerk management features and/or motion profiles may be tuned to achieve a desired level of control.

In some embodiments, the at least one torque signal may be indicative of engine torque supplied by the mechanical power source 18, including signals indicative of torque peaks corresponding to a maximum torque supplied by operation of the mechanical power source 18 and torque valleys corresponding to a minimum torque supplied by operation of the mechanical power source 18. In some embodiments, the at least one torque control signal may be configured to smooth operation of the powertrain 14. For example, the at least one torque control signal may include at least one engine control signal configured to reduce the torque peaks, at least one engine control signal configured to reduce a magnitude of the torque valleys, at least one generator control signal configured to cause a relative increase in the generator torque resisting the engine torque corresponding to the torque peaks, or at least one generator control signal configured to cause a relative decrease in the generator torque resisting the engine torque corresponding to the torque valleys.

In some embodiments, the at least one torque signal may include at least one engine speed signal indicative of a rotational speed of an output shaft of the mechanical power source 18. For example, the rotational speed of the output shaft (e.g., the output shaft speed 118) may be used to approximate the torque of the output shaft of the mechanical power source 18. In some embodiments, the torque control system 51 may be configured to generate, based at least in part on the at least one engine speed signal, at least one torque control signal configured to change the generator torque, such that the rotational speed of the output shaft of the mechanical power source 18 remains below a maximum rotational speed, remains above a minimum rotational speed, or remains within a range of rotational speeds. In such embodiments, the torque controller 106 may manage torque based on a target output shaft speed 118. The target may be established based at least in part on the rating of the electric power generation device 24 and, in some instances, coordinated in combination with other factors. The torque control system 51 may update the output shaft speed sensing at a high frequency and may adjust the generator torque to maintain the target output shaft speed. This may result in increasing generator torque resisting the engine torque when the output shaft speed is above the target output shaft speed and reducing generator torque resisting the engine torque when the output shaft speed is below the target output shaft speed.

For example, in some embodiments, the at least one torque control signal may be configured to cause one of a relative increase in the generator torque resisting the engine torque when the rotational speed of the output shaft of the mechanical power source 18 approaches or exceeds the maximum rotational speed, a relative decrease in the generator torque resisting the engine torque when the rotational speed of the output shaft of the mechanical power source 18 approaches or falls below the minimum rotational speed, or a change in the generator torque resisting the engine torque in order to maintain the rotational speed of the output shaft of the mechanical power source 18 within the range of a target rotational speed.

In some embodiments, the at least one torque signal indicative of engine torque supplied by the mechanical power source may include at least one torque transducer signal indicative of torque supplied by an output shaft of the mechanical power source 18, at least one engine speed signal indicative of a rotational speed of an output shaft of the mechanical power source 18, at least one output shaft angle signal indicative of an angle of an output shaft of the mechanical power source, and/or at least one voltage signal indicative of a back voltage of the electrical power generation device. Other signal sources for the torque signals are contemplated.

In some embodiments, the torque control system also may be configured to receive at least one operational signal 126, as shown in FIG. 5, indicative of at least one of a location of the aerial vehicle 10, motion of the aerial vehicle 10 (e.g., heading, speed, and/or orientation of the aerial vehicle), at least one object in an environment surrounding the aerial vehicle 10, the weight of the aerial vehicle 10, the weight distribution of the aerial vehicle 10, the weight of a payload carried by the aerial vehicle 10, or an amount of fuel in the fuel supply carried by the aerial vehicle 10. Based at least in part on the at least one operational signal 126, the torque control system 51 may be configured to generate at least one torque control signal configured to change the engine torque and/or change the generator torque. Such embodiments may control the torque based at least in part on how the aerial vehicle 10 is being maneuvered and/or the condition or location of the aerial vehicle 10.

FIG. 7 is a block diagram of an example method 700 for controlling generator torque generated by an electric power generation device resisting engine torque generated by a mechanical power source coupled to an aerial vehicle illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIG. 7 is a flow diagram of an example method 700 for controlling generator torque generated by an electric power generation device resisting engine torque generated by a mechanical power source coupled to an aerial vehicle. At 702, the example method 702 may include receiving at least one torque signal indicative of engine torque supplied by the mechanical power source and/or generator torque generated by the electric power generation device resisting the engine torque. For example, as explained herein, the torque control system may receive a signal indicative of the engine torque and/or the generator torque from one or more of many different sensors or according to any one or more of many different approximations.

At 704, the example method 700 also may include generating, based at least in part on the one or more torque signals, at least one torque control signal configured to change the engine torque and/or change the generator torque. For example, at 706, when the at least one torque signal is indicative of a relative reduction in the engine torque supplied by the mechanical power source, the at least one torque control signal may be configured to cause a relative reduction in the generator torque resisting the engine torque. At 708, when the at least one torque signal is indicative of a relative increase in the engine torque supplied by the mechanical power source, the at least one torque control signal may be configured to cause a relative increase in the generator torque resisting the engine torque. This example process 700 may be used to perform a number of possible functions, such as, but not limited to, increasing the fuel efficiency of the mechanical power source, increasing the power output of the mechanical power source, reducing vibration associated with operation of the mechanical power source or the powertrain, which may reduce wear rates or damage associated with the powertrain and/or the aerial vehicle, reduce the size or volume of a flywheel and/or eliminate the need for a flywheel, and/or prevent the likelihood of stalling of the mechanical power source and provide a potential way to restart the mechanical power source if it stalls. Such functions may be performed as described herein.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, mobile telephone devices, tablet computing devices, special-purposed hardware devices, network appliances, and the like.

ADDITIONAL EXAMPLES

An example powertrain for an aerial vehicle may include a mechanical power source configured to supply mechanical power; an electric power generation device mechanically coupled to the mechanical power source and configured to convert at least a portion of the mechanical power into electrical power; and a torque control system associated with the powertrain, the torque control system configured to: receive at least one torque signal indicative of at least one of engine torque supplied by the mechanical power source or generator torque generated by the electric power generation device resisting the engine torque; and generate, based at least in part on the at least one torque signal, at least one torque control signal configured to at least one of change the engine torque or change the generator torque, wherein at least one of: when the at least one torque signal is indicative of a relative reduction in the engine torque supplied by the mechanical power source, the at least one torque control signal is configured to cause a relative reduction in the generator torque resisting the engine torque; or when the at least one torque signal is indicative of a relative increase in the engine torque supplied by the mechanical power source, the at least one torque control signal is configured to cause a relative increase in the generator torque resisting the engine torque.

The example powertrain above, wherein the torque control system comprises a torque controller configured to: receive the at least one torque signal indicative of at least one of engine torque supplied by the mechanical power source or generator torque resisting the engine torque; and generate, based at least in part on the at least one torque signal, the at least one torque control signal configured to at least one of change the engine torque or change the generator torque.

Any one of the example powertrains above, further comprising an engine controller configured to: at least partially control operation of the mechanical power source; receive the at least one torque control signal; and control, based at least in part on the at least one torque control signal, output of the mechanical power source.

Any one of the example powertrains above, wherein the engine controller is configured to control output of the mechanical power source by generating at least one engine control signal comprising one or more of: at least one ignition timing signal configured to at least partially control timing of an ignition of combustion in the mechanical power source; or at least one fuel control signal configured to at least partially control operation of at least one of a carburetor (e.g., actuates a linkage controlling the carburetor) or a fuel injector (e.g., a pulse).

Any one of the example powertrains above, further comprising a generator controller configured to: at least partially control operation of the electric power generation device; receive the at least one torque control signal; or control, based at least in part on the at least one torque control signal, the generator torque resisting the engine torque.

Any one of the example powertrains above, wherein: the at least one torque signal is indicative of a relative reduction in the engine torque supplied by the mechanical power source; and the at least one torque control signal is configured to control at least one of MOSFETs of the electric power generation device or IGBTs of the electric power generation device to reduce the generator torque resisting the engine torque.

Any one of the example powertrains above, wherein: the at least one torque signal is indicative of a relative increase in the engine torque supplied by the mechanical power source; and the at least one torque control signal is configured to control at least one of MOSFETs of the electric power generation device or IGBTs of the electric power generation device to increase the generator torque resisting the engine torque.

Any one of the example powertrains above, wherein: the at least one torque signal is indicative of a relative reduction in the engine torque indicative of the mechanical power source ceasing operation; and the at least one torque control signal is configured to cause the electric power generation device to supply torque to the mechanical power source to one or more of prevent the mechanical power source from ceasing operation or restarting operation of the mechanical power source.

Any one of the example powertrains above, wherein the torque control system comprises a torque controller configured to: receive at least one signal indicative of an output shaft angle of an output shaft of the mechanical power source; determine that the output shaft angle is within a predetermined range of angles after top-dead-center; and generate, based at least in part on the determination, at least one torque control signal configured to cause a relative increase in the generator torque resisting the engine torque.

Any one of the example powertrains above, wherein the torque control system comprises a torque controller configured to: receive at least one ignition signal indicative of an ignition of combustion in the mechanical power source; and generate, based at least in part on the at least one ignition signal, at least one torque control signal configured to cause a relative increase in the generator torque resisting the engine torque.

Any one of the example powertrains above, wherein the torque control system comprises a torque controller configured to: receive at least one signal indicative of an output shaft angle of an output shaft of the mechanical power source; determine that the output shaft angle is within a predetermined range of angles before top-dead-center; and generate, based at least in part on the determination, at least one torque control signal configured to cause a relative decrease in the generator torque resisting the engine torque.

Any one of the example powertrains above, wherein the torque control system comprises a torque controller configured to: receive at least one vibration signal indicative of one or more of an amplitude of vibration associated with operation of the mechanical power source or a frequency of vibration associated with operation of the mechanical power source; and generate, based at least in part on the at least one vibration signal, at least one torque control signal configured to at least one of alter operation of the mechanical power source or control the generator torque resisting the engine torque to reduce vibration associated with operation of the mechanical power source.

Any one of the example powertrains above, wherein: the at least one torque signal is indicative of engine torque supplied by the mechanical power source, the at least one torque signal being indicative of torque peaks corresponding to a maximum torque supplied by operation of the mechanical power source and torque valleys corresponding to a minimum torque supplied by operation of the mechanical power source; and the at least one torque control signal is configured to smooth operation of the powertrain, the at least one torque control signal comprising at least one of: at least one engine control signal configured to reduce the torque peaks; at least one engine control signal configured to reduce a magnitude of the torque valleys; at least one generator control signal configured to cause a relative increase in the generator torque resisting the engine torque corresponding to the torque peaks; or at least one generator control signal configured to cause a relative decrease in the generator torque resisting the engine torque corresponding to the torque valleys.

Any one of the example powertrains above, wherein: the at least one torque signal comprises at least one engine speed signal indicative of a rotational speed of an output shaft of the mechanical power source; and the torque control system is configured to generate, based at least in part on the at least one engine speed signal, at least one torque control signal configured to change the generator torque, such that the rotational speed of the output shaft of the mechanical power source one of: remains below a maximum rotational speed, remains above a minimum rotational speed, or remains within a range of rotational speeds.

Any one of the example powertrains above, wherein the at least one torque control signal is configured to cause one of: a relative increase in the generator torque resisting the engine torque when the rotational speed of the output shaft of the mechanical power source approaches or exceeds the maximum rotational speed; a relative decrease in the generator torque resisting the engine torque when the rotational speed of the output shaft of the mechanical power source approaches or falls below the minimum rotational speed; or a change in the generator torque resisting the engine torque in order to maintain the rotational speed of the output shaft of the mechanical power source within the range of rotational speeds.

Any one of the example powertrains above, wherein the at least one torque signal indicative of engine torque supplied by the mechanical power source comprises at least one of: at least one torque transducer signal indicative of torque supplied by an output shaft of the mechanical power source; at least one engine speed signal indicative of a rotational speed of an output shaft of the mechanical power source; at least one output shaft angle signal indicative of an angle of an output shaft of the mechanical power source; or at least one voltage signal indicative of a back voltage of the electrical power generation device.

Any one of the example powertrains above, wherein the torque control system is further configured to: receive at least one operational signal indicative of at least one of a location of the aerial vehicle, motion of the aerial vehicle (e.g., heading, speed, and/or orientation of the aerial vehicle), at least one object in an environment surrounding the aerial vehicle, the weight of the aerial vehicle, the weight distribution of the aerial vehicle, the weight of a payload carried by the aerial vehicle, or an amount of fuel in the fuel supply carried by the aerial vehicle; and generate, based at least in part on the at least one operational signal, at least one torque control signal configured to at least one of change the engine torque or change the generator torque.

Any one of the example powertrains above, wherein the mechanical power source comprises one of a reciprocating-piston engine, a gas turbine engine, or a turbofan.

Any one of the example powertrains above, wherein the mechanical power source comprises a reciprocating-piston engine comprising one or more of a two-stroke engine, a four-stroke engine, a single-cylinder engine, or a multi-cylinder engine.

Any one of the example powertrains above, wherein the electric power generation device comprises a combination motor-generator configured to: convert mechanical torque supplied by the mechanical power source into electrical power; and convert electrical power into mechanical torque to supply torque to the mechanical power source.

Any one of the example powertrains above, wherein the motor-generator comprises a three-phase DC motor generator comprising switching devices.

An example aerial vehicle may include a chassis; a mechanical power source coupled to the chassis and configured to supply mechanical power; an electric power generation device coupled to the chassis and the mechanical power source and configured to convert at least a portion of the mechanical power into electrical power; an electric motor coupled to the chassis and the electric power generation device and configured to convert electrical power into rotational power; a first propulsion member coupled to the chassis and the mechanical power source and configured to convert at least a portion of the mechanical power supplied by the mechanical power source into a first thrust force; a second propulsion member coupled to the chassis and the electric motor and configured to convert the rotational power supplied by the electric motor into a second thrust force; and a torque control system associated with the powertrain, the torque control system configured to: receive at least one torque signal indicative of at least one of engine torque supplied by the mechanical power source or generator torque generated by the electric power generation device resisting the engine torque; and generate, based at least in part on the at least one torque signal, at least one torque control signal configured to at least one of change the engine torque or change the generator torque, wherein at least one of: when the at least one torque signal is indicative of a relative reduction in the engine torque supplied by the mechanical power source, the at least one torque control signal is configured to cause a relative reduction in the generator torque resisting the engine torque; or when the at least one torque signal is indicative of a relative increase in the engine torque supplied by the mechanical power source, the at least one torque control signal is configured to cause a relative increase in the generator torque resisting the engine torque.

The example aerial vehicle above, wherein the torque control system comprises a torque controller configured to: receive the at least one torque signal indicative of at least one of engine torque supplied by the mechanical power source or generator torque resisting the engine torque; and generate, based at least in part on the at least one torque signal, the at least one torque control signal configured to at least one of change the engine torque or change the generator torque.

Any one of the example aerial vehicles above, further comprising an engine controller configured to: at least partially control operation of the mechanical power source; receive the at least one torque control signal; and control, based at least in part on the at least one torque control signal, output of the mechanical power source.

Any one of the example aerial vehicles above, wherein the engine controller is configured to control output of the mechanical power source by generating at least one engine control signal comprising one or more of: at least one ignition timing signal configured to at least partially control timing of an ignition of combustion in the mechanical power source; or at least one fuel control signal configured to at least partially control operation of at least one of a carburetor (actuates a linkage controlling the carburetor) or a fuel injector (e.g., a pulse).

Any one of the example aerial vehicles above, further comprising a generator controller configured to: at least partially control operation of the electric power generation device; receive the at least one torque control signal; or control, based at least in part on the at least one torque control signal, the generator torque resisting the engine torque.

Any one of the example aerial vehicles above, wherein: the at least one torque signal is indicative of a relative reduction in the engine torque supplied by the mechanical power source; and the at least one torque control signal is configured to control at least one of MOSFETs of the electric power generation device or IGBTs of the electric power generation device to reduce the generator torque resisting the engine torque.

Any one of the example aerial vehicles above, wherein: the at least one torque signal is indicative of a relative increase in the engine torque supplied by the mechanical power source; and the at least one torque control signal is configured to control at least one of MOSFETs of the electric power generation device or IGBTs of the electric power generation device to increase the generator torque resisting the engine torque.

Any one of the example aerial vehicles above, wherein: the at least one torque signal is indicative of a relative reduction in the engine torque indicative of the mechanical power source ceasing operation; and the at least one torque control signal is configured to cause the electric power generation device to supply torque to the mechanical power source to one or more of prevent the mechanical power source from ceasing operation or restarting operation of the mechanical power source.

Any one of the example aerial vehicles above, wherein the torque control system comprises a torque controller configured to: receive at least one signal indicative of an output shaft angle of an output shaft of the mechanical power source; determine that the output shaft angle is within a predetermined range of angles after top-dead-center; and generate, based at least in part on the determination, at least one torque control signal configured to cause a relative increase in the generator torque resisting the engine torque.

Any one of the example aerial vehicles above, wherein the torque control system comprises a torque controller configured to: receive at least one ignition signal indicative of an ignition of combustion in the mechanical power source; and generate, based at least in part on the at least one ignition signal, at least one torque control signal configured to cause a relative increase in the generator torque resisting the engine torque.

Any one of the example aerial vehicles above, wherein the torque control system comprises a torque controller configured to: receive at least one signal indicative of an output shaft angle of an output shaft of the mechanical power source; determine that the output shaft angle is within a predetermined range of angles before top-dead-center; and generate, based at least in part on the determination, at least one torque control signal configured to cause a relative decrease in the generator torque resisting the engine torque.

Any one of the example aerial vehicles above, wherein the torque control system comprises a torque controller configured to: receive at least one vibration signal indicative of one or more of an amplitude of vibration associated with operation of the mechanical power source or a frequency of vibration associated with operation of the mechanical power source; and generate, based at least in part on the at least one vibration signal, at least one torque control signal configured to at least one of alter operation of the mechanical power source or control the generator torque resisting the engine torque to reduce vibration associated with operation of the mechanical power source.

Any one of the example aerial vehicles above, wherein: the at least one torque signal is indicative of engine torque supplied by the mechanical power source, the at least one torque signal being indicative of torque peaks corresponding to a maximum torque supplied by operation of the mechanical power source and torque valleys corresponding to a minimum torque supplied by operation of the mechanical power source; and the at least one torque control signal is configured to smooth operation of the powertrain, the at least one torque control signal comprising at least one of: at least one engine control signal configured to reduce the torque peaks; at least one engine control signal configured to reduce a magnitude of the torque valleys; at least one generator control signal configured to cause a relative increase in the generator torque resisting the engine torque corresponding to the torque peaks; or at least one generator control signal configured to cause a relative decrease in the generator torque resisting the engine torque corresponding to the torque valleys.

Any one of the example aerial vehicles above, wherein: the at least one torque signal comprises at least one engine speed signal indicative of a rotational speed of an output shaft of the mechanical power source; and the torque control system is configured to generate, based at least in part on the at least one engine speed signal, at least one torque control signal configured to change the generator torque, such that the rotational speed of the output shaft of the mechanical power source one of: remains below a maximum rotational speed, remains above a minimum rotational speed, or remains within a range of rotational speeds.

Any one of the example aerial vehicles above, wherein the at least one torque control signal is configured to cause one of: a relative increase in the generator torque resisting the engine torque when the rotational speed of the output shaft of the mechanical power source approaches or exceeds the maximum rotational speed; a relative decrease in the generator torque resisting the engine torque when the rotational speed of the output shaft of the mechanical power source approaches or falls below the minimum rotational speed; or a change in the generator torque resisting the engine torque in order to maintain the rotational speed of the output shaft of the mechanical power source within the range of rotational speeds.

Any one of the example aerial vehicles above, wherein the at least one torque signal indicative of engine torque supplied by the mechanical power source comprises at least one of: at least one torque transducer signal indicative of torque supplied by an output shaft of the mechanical power source; at least one engine speed signal indicative of a rotational speed of an output shaft of the mechanical power source; at least one output shaft angle signal indicative of an angle of an output shaft of the mechanical power source; or at least one voltage signal indicative of a back voltage of the electrical power generation device.

Any one of the example aerial vehicles above, wherein the torque control system is further configured to: receive at least one operational signal indicative of at least one of a location of the aerial vehicle, motion of the aerial vehicle (e.g., heading, speed, and/or orientation of the aerial vehicle), at least one object in an environment surrounding the aerial vehicle, the weight of the aerial vehicle, the weight distribution of the aerial vehicle, the weight of a payload carried by the aerial vehicle, or an amount of fuel in the fuel supply carried by the aerial vehicle; and generate, based at least in part on the at least one operational signal, at least one torque control signal configured to at least one of change the engine torque or change the generator torque.

Any one of the example aerial vehicles above, wherein the mechanical power source comprises one of a reciprocating-piston engine, a gas turbine engine, or a turbofan.

Any one of the example aerial vehicles above, wherein the mechanical power source comprises a reciprocating-piston engine comprising one or more of a two-stroke engine, a four-stroke engine, a single-cylinder engine, or a multi-cylinder engine.

Any one of the example aerial vehicles above, wherein the electric power generation device comprises a combination motor-generator configured to: convert mechanical torque supplied by the mechanical power source into electrical power; and convert electrical power into mechanical torque to supply torque to the mechanical power source.

Any one of the example aerial vehicles above, wherein the motor-generator comprises a three-phase DC motor generator comprising switching devices.

An example method for controlling generator torque generated by an electric power generation device resisting engine torque generated by a mechanical power source coupled to an aerial vehicle, may include: receiving at least one torque signal indicative of at least one of engine torque supplied by the mechanical power source or generator torque generated by the electric power generation device resisting the engine torque; and generating, based at least in part on the at least one torque signal, at least one torque control signal configured to at least one of change the engine torque or change the generator torque, wherein at least one of: when the at least one torque signal is indicative of a relative reduction in the engine torque supplied by the mechanical power source, the at least one torque control signal is configured to cause a relative reduction in the generator torque resisting the engine torque; or when the at least one torque signal is indicative of a relative increase in the engine torque supplied by the mechanical power source, the at least one torque control signal is configured to cause a relative increase in the generator torque resisting the engine torque.

The example method above, wherein generating, based at least in part on the at least one torque signal, the at least one torque control signal comprises at least one of: generating at least one ignition timing signal configured to at least partially control timing of an ignition of combustion in the mechanical power source; or generating at least one fuel control signal configured to at least partially control operation of at least one of a carburetor (e.g., actuates a linkage controlling the carburetor) or a fuel injector (e.g., a pulse).

Any one of the example methods above, further comprising a generator controller configured to: at least partially control operation of the electric power generation device; receive the at least one torque control signal; or control, based at least in part on the at least one torque control signal, the generator torque resisting the engine torque.

Any one of the example methods above, wherein: the at least one torque signal is indicative of a relative reduction in the engine torque supplied by the mechanical power source; and the at least one torque control signal is configured to control at least one of MOSFETs of the electric power generation device or IGBTs of the electric power generation device to reduce the generator torque resisting the engine torque.

Any one of the example methods above, wherein: the at least one torque signal is indicative of a relative increase in the engine torque supplied by the mechanical power source; and the at least one torque control signal is configured to control at least one of MOSFETs of the electric power generation device or IGBTs of the electric power generation device to increase the generator torque resisting the engine torque.

Any one of the example methods above, wherein: the at least one torque signal is indicative of a relative reduction in the engine torque indicative of the mechanical power source ceasing operation; and the at least one torque control signal is configured to cause the electric power generation device to supply torque to the mechanical power source to one or more of prevent the mechanical power source from ceasing operation or restarting operation of the mechanical power source.

Any one of the example methods above, further comprising: receiving at least one signal indicative of an output shaft angle of an output shaft of the mechanical power source; determining that the output shaft angle is within a predetermined range of angles after top-dead-center; and generating, based at least in part on the determination, at least one torque control signal configured to cause a relative increase in the generator torque resisting the engine torque.

Any one of the example methods above, further comprising: receiving at least one ignition signal indicative of an ignition of combustion in the mechanical power source; and generating, based at least in part on the at least one ignition signal, at least one torque control signal configured to cause a relative increase in the generator torque resisting the engine torque.

Any one of the example methods above, further comprising: receiving at least one signal indicative of an output shaft angle of an output shaft of the mechanical power source; determining, based at least in part on the at least one signal indicative of an output shaft angle, that the output shaft angle is within a predetermined range of angles before top-dead-center; and generating, based at least in part on the determination, at least one torque control signal configured to cause a relative decrease in the generator torque resisting the engine torque.

Any one of the example methods above, further comprising: receiving at least one vibration signal indicative of one or more of an amplitude of vibration associated with operation of the mechanical power source or a frequency of vibration associated with operation of the mechanical power source; and generating, based at least in part on the at least one vibration signal, at least one torque control signal configured to at least one of alter operation of the mechanical power source or control the generator torque resisting the engine torque to reduce vibration associated with operation of the mechanical power source.

Any one of the example methods above, wherein: the at least one torque signal is indicative of engine torque supplied by the mechanical power source, the at least one torque signal being indicative of torque peaks corresponding to a maximum torque supplied by operation of the mechanical power source and torque valleys corresponding to a minimum torque supplied by operation of the mechanical power source; and generating the at least one torque control signal is configured to smooth operation of the powertrain, the at least one torque control signal comprising at least one of: at least one engine control signal configured to reduce the torque peaks; at least one engine control signal configured to reduce a magnitude of the torque valleys; at least one generator control signal configured to cause a relative increase in the generator torque resisting the engine torque corresponding to the torque peaks; or at least one generator control signal configured to cause a relative decrease in the generator torque resisting the engine torque corresponding to the torque valleys.

Any one of the example methods above, wherein: the at least one torque signal comprises at least one engine speed signal indicative of a rotational speed of an output shaft of the mechanical power source; and the method further comprises: generating, based at least in part on the at least one engine speed signal, at least one torque control signal configured to change the generator torque, such that the rotational speed of the output shaft of the mechanical power source one of: remains below a maximum rotational speed, remains above a minimum rotational speed, or remains within a range of rotational speeds.

Any one of the example methods above, wherein the at least one torque control signal is configured to cause one of: a relative increase in the generator torque resisting the engine torque when the rotational speed of the output shaft of the mechanical power source approaches or exceeds the maximum rotational speed; a relative decrease in the generator torque resisting the engine torque when the rotational speed of the output shaft of the mechanical power source approaches or falls below the minimum rotational speed; or a change in the generator torque resisting the engine torque in order to maintain the rotational speed of the output shaft of the mechanical power source within the range of rotational speeds.

Any one of the example methods above, wherein the at least one torque signal indicative of engine torque supplied by the mechanical power source comprises at least one of: at least one torque transducer signal indicative of torque supplied by an output shaft of the mechanical power source; at least one engine speed signal indicative of a rotational speed of an output shaft of the mechanical power source; at least one output shaft angle signal indicative of an angle of an output shaft of the mechanical power source; or at least one voltage signal indicative of a back voltage of the electrical power generation device.

Any one of the example methods above, further comprising: receiving at least one operational signal indicative of at least one of a location of the aerial vehicle, motion of the aerial vehicle (e.g., heading, speed, and/or orientation of the aerial vehicle), at least one object in an environment surrounding the aerial vehicle, the weight of the aerial vehicle, the weight distribution of the aerial vehicle, the weight of a payload carried by the aerial vehicle, or an amount of fuel in the fuel supply carried by the aerial vehicle; and generating, based at least in part on the at least one operational signal, at least one torque control signal configured to at least one of change the engine torque or change the generator torque.

Any one of the example methods above, wherein the mechanical power source comprises one of a reciprocating-piston engine, a gas turbine engine, or a turbofan.

Any one of the example methods above, wherein the mechanical power source comprises a reciprocating-piston engine comprising one or more of a two-stroke engine, a four-stroke engine, a single-cylinder engine, or a multi-cylinder engine.

Any one of the example methods above, wherein the electric power generation device comprises a combination motor-generator configured to: convert mechanical torque supplied by the mechanical power source into electrical power; and convert electrical power into mechanical torque to supply torque to the mechanical power source.

Any one of the example methods above, wherein the motor-generator comprises a three-phase DC motor generator comprising switching devices.

What is claimed is:
1. A powertrain for an aerial vehicle, the powertrain comprising:
   a mechanical power source configured to supply mechanical power to a propulsion member;
   an electric power generation device mechanically coupled to the mechanical power source and configured to convert at least a portion of the mechanical power into electrical power; and
   a torque control system associated with the powertrain, the torque control system comprising a torque controller configured to:
      receive at least one torque signal indicative of engine torque supplied by the mechanical power source, the at least one torque signal being indicative of torque peaks corresponding to a maximum torque supplied by operation of the mechanical power source and torque valleys corresponding to a minimum torque supplied by operation of the mechanical power source; and
      generate, based at least in part on the at least one torque signal, at least one torque control signal configured to change generator torque generated by the electric power generation device, wherein at least one of:
         when the at least one torque signal is indicative of a relative reduction in the engine torque supplied by the mechanical power source, the at least one torque control signal is configured to cause a relative reduction in the generator torque resisting the engine torque; or
         when the at least one torque signal is indicative of a relative increase in the engine torque supplied by the mechanical power source, the at least one torque control signal is configured to cause a relative increase in the generator torque resisting the engine torque,
   wherein the torque controller is also configured to:
      receive at least one output shaft angle signal indicative of an output shaft angle of an output shaft of the mechanical power source;
      determine that the output shaft angle is within a predetermined range of angles after top-dead-center; and
      generate, based at least in part on the determination, at least one first output shaft angle torque control signal configured to cause a relative increase in the generator torque resisting the engine torque to at least partially offset at least one torque peak to smooth operation of the powertrain,
   wherein the torque controller is also configured to:
      receive the least one output shaft angle signal indicative of the output shaft angle of the output shaft of the mechanical power source;
      determine that the output shaft angle is within a predetermined range of angles before top-dead-center; and
      generate, based at least in part on the determination, at least one second output shaft angle torque control signal configured to cause a relative decrease in the generator torque resisting the engine torque to at least partially offset at least one torque valley to smooth operation of the powertrain.

2. The powertrain of claim 1, further comprising an engine controller configured to:

at least partially control operation of the mechanical power source;

receive the at least one torque control signal; and control, based at least in part on the at least one torque control signal, output of the mechanical power source.

3. The powertrain of claim 2, wherein the engine controller is configured to control output of the mechanical power source by generating at least one engine control signal comprising one or more of:

at least one ignition timing signal configured to at least partially control timing of an ignition of combustion in the mechanical power source; or at least one fuel control signal configured to at least partially control operation of at least one of a carburetor or a fuel injector.

4. The powertrain of claim 1, further comprising a generator controller configured to:

at least partially control operation of the electric power generation device;

receive the at least one torque control signal; or control, based at least in part on the at least one torque control signal, the generator torque resisting the engine torque.

5. The powertrain of claim 1, wherein:

the at least one torque signal is indicative of a relative reduction in the engine torque supplied by the mechanical power source; and the at least one torque control signal is configured to control at least one of metal-oxide-semiconductor field-effect transistors (MOSFETs) of the electric power generation device or insulated-gate bipolar transistors (IGBTs) of the electric power generation device to reduce the generator torque resisting the engine torque.

6. The powertrain of claim 1, wherein:

the at least one torque signal is indicative of a relative increase in the engine torque supplied by the mechanical power source; and the at least one torque control signal is configured to control at least one of metal-oxide-semiconductor field-effect transistors (MOSFETs) of the electric power generation device or insulated-gate bipolar transistors (IGBTs) of the electric power generation device to increase the generator torque resisting the engine torque.

7. The powertrain of claim 1, wherein:

the at least one torque signal is indicative of a relative reduction in the engine torque indicative of the mechanical power source ceasing operation; and the at least one torque control signal is configured to cause the electric power generation device to supply torque to the mechanical power source to one or more of prevent the mechanical power source from ceasing operation or restarting operation of the mechanical power source.

8. The powertrain of claim 1, wherein the torque controller is configured to:

receive at least one ignition signal indicative of an ignition of combustion in the mechanical power source; and generate, based at least in part on the at least one ignition signal, at least one torque control signal configured to cause a relative increase in the generator torque resisting the engine torque.

9. The powertrain of claim 1, wherein the torque controller is configured to:

receive at least one vibration signal indicative of one or more of an amplitude of vibration associated with operation of the mechanical power source or a frequency of vibration associated with operation of the mechanical power source; and generate, based at least in part on the at least one vibration signal, at least one torque control signal configured to at least one of alter operation of the mechanical power source or control the generator torque resisting the engine torque to reduce vibration associated with operation of the mechanical power source.

10. The powertrain of claim 1, wherein:

the at least one torque control signal is configured to smooth operation of the powertrain, the at least one torque control signal comprising at least one of:

at least one engine control signal configured to reduce the torque peaks; or at least one engine control signal configured to reduce a magnitude of the torque valleys.

11. The powertrain of claim 1, wherein:

the at least one torque signal comprises at least one engine speed signal indicative of a rotational speed of an output shaft of the mechanical power source; and the torque controller is configured to generate, based at least in part on the at least one engine speed signal, at least one torque control signal configured to change the generator torque, such that the rotational speed of the output shaft of the mechanical power source one of:

remains below a maximum rotational speed;

remains above a minimum rotational speed; or remains within a range of rotational speeds.

12. The powertrain of claim 1, wherein the least one torque control signal is configured to cause one of:

a relative increase in the generator torque resisting the engine torque when the rotational speed of the output shaft of the mechanical power source approaches or exceeds the maximum rotational speed;

a relative decrease in the generator torque resisting the engine torque when the rotational speed of the output shaft of the mechanical power source approaches or falls below the minimum rotational speed; or a change in the generator torque resisting the engine torque in order to maintain the rotational speed of the output shaft of the mechanical power source within the range of rotational speeds.

13. The powertrain of claim 1, wherein the at least one torque signal indicative of engine torque supplied by the mechanical power source comprises at least one of:

at least one torque transducer signal indicative of torque supplied by an output shaft of the mechanical power source;

at least one engine speed signal indicative of a rotational speed of an output shaft of the mechanical power source;

at least one output shaft angle signal indicative of an angle of an output shaft of the mechanical power source; or at least one voltage signal indicative of a back voltage of the electrical power generation device.

14. The powertrain of claim 1, wherein the torque controller is further configured to:

receive at least one operational signal indicative of at least one of a location of the aerial vehicle, motion of the aerial vehicle, at least one object in an environment surrounding the aerial vehicle, a weight of the aerial vehicle, a weight distribution of the aerial vehicle, a weight of a payload carried by the aerial vehicle, or an amount of fuel in a fuel supply carried by the aerial vehicle; and generate, based at least in part on the at least one operational signal, at least one torque control signal configured to at least one of change the engine torque or change the generator torque.

15. An aerial vehicle comprising:

a chassis;

a mechanical power source coupled to the chassis and configured to supply mechanical power;

an electric power generation device coupled to the chassis and the mechanical power source and configured to convert at least a portion of the mechanical power into electrical power;

an electric motor coupled to the chassis and the electric power generation device and configured to convert electrical power into rotational power;

a first propulsion member coupled to the chassis and the mechanical power source and configured to convert at least a portion of the mechanical power supplied by the mechanical power source into a first thrust force;

a second propulsion member coupled to the chassis and the electric motor and configured to convert the rotational power supplied by the electric motor into a second thrust force; and a torque control system associated with the powertrain, the torque control system comprising a torque controller configured to:

receive at least one torque signal indicative of engine torque supplied by the mechanical power source, the at least one torque signal being indicative of torque peaks corresponding to a maximum torque supplied by operation of the mechanical power source and torque valleys corresponding to a minimum torque supplied by operation of the mechanical power source; and generate, based at least in part on the at least one torque signal, at least one torque control signal configured to change generator torque generated by the electric power generation device, wherein at least one of:

when the at least one torque signal is indicative of a relative reduction in the engine torque supplied by the mechanical power source, the at least one torque control signal is configured to cause a relative reduction in the generator torque resisting the engine torque; or when the at least one torque signal is indicative of a relative increase in the engine torque supplied by the mechanical power source, the at least one torque control signal is configured to cause a relative increase in the generator torque resisting the engine torque, wherein the torque controller is also configured to:

receive at least one output shaft angle signal indicative of an output shaft angle of an output shaft of the mechanical power source;

determine that the output shaft angle is within a predetermined range of angles after top-dead-center; and generate, based at least in part on the determination, at least one first output shaft angle torque control signal configured to cause a relative increase in the generator torque resisting the engine torque to at least partially offset at least one torque peak to smooth operation of the powertrain, wherein the torque controller is also configured to:

receive the least one output shaft angle signal indicative of the output shaft angle of the output shaft of the mechanical power source;

determine that the output shaft angle is within a predetermined range of angles before top-dead-center; and generate, based at least in part on the determination, at least one second output shaft angle torque control signal configured to cause a relative decrease in the generator torque resisting the engine torque to at least partially offset at least one torque valley to smooth operation of the powertrain.

16. The aerial vehicle of claim 15, wherein:

the at least one torque signal comprises at least one engine speed signal indicative of a rotational speed of an output shaft of the mechanical power source; and the torque controller is configured to generate, based at least in part on the at least one engine speed signal, at least one torque control signal configured to change the generator torque, such that the rotational speed of the output shaft of the mechanical power source one of:

remains below a maximum rotational speed;

remains above a minimum rotational speed; or remains within a range of rotational speeds.

17. The aerial vehicle of claim 15, wherein the at least one torque control signal is configured to cause one of:

a relative increase in the generator torque resisting the engine torque when the rotational speed of the output shaft of the mechanical power source approaches or exceeds the maximum rotational speed;

a relative decrease in the generator torque resisting the engine torque when the rotational speed of the output shaft of the mechanical power source approaches or falls below the minimum rotational speed; or a change in the generator torque resisting the engine torque in order to maintain the rotational speed of the output shaft of the mechanical power source within the range of rotational speeds.

18. The aerial vehicle of claim 15, wherein the torque controller is further configured to:

receive at least one operational signal indicative of at least one of a location of the aerial vehicle, motion of the aerial vehicle, at least one object in an environment surrounding the aerial vehicle, a weight of the aerial vehicle, a weight distribution of the aerial vehicle, a weight of a payload carried by the aerial vehicle, or an amount of fuel in a fuel supply carried by the aerial vehicle; and generate, based at least in part on the at least one operational signal, at least one torque control signal configured to at least one of change the engine torque or change the generator torque.

* * * * *